United States Patent
Musolf et al.

(10) Patent No.: US 7,792,480 B2
(45) Date of Patent: Sep. 7, 2010

(54) ELECTROGRAPHIC POSITION LOCATION APPARATUS INCLUDING RECORDING CAPABILITY AND DATA CARTRIDGE INCLUDING MICROPHONE

(75) Inventors: Tom Musolf, Mountain View, CA (US); Richard Glen Freeman, San Carlos, CA (US); Michael P. Much, San Jose, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 1927 days.

(21) Appl. No.: 10/750,982

(22) Filed: Jan. 2, 2004

(65) Prior Publication Data
US 2004/0197757 A1 Oct. 7, 2004

Related U.S. Application Data

(60) Provisional application No. 60/512,275, filed on Oct. 17, 2003, provisional application No. 60/487,440, filed on Jul. 14, 2003, provisional application No. 60/437,770, filed on Jan. 3, 2003.

(51) Int. Cl.
G09B 5/00 (2006.01)
G09B 5/04 (2006.01)
(52) U.S. Cl. .................. 434/317; 434/112; 434/156; 434/307 R; 434/308; 434/319
(58) Field of Classification Search ......... 434/317–319, 434/308, 307, 112, 133, 155, 156, 307 R; 446/1
See application file for complete search history.

(56) References Cited

U.S. PATENT DOCUMENTS 3,702,515 A * 11/1972 Beasley et al. .............. 446/142
3,793,766 A * 2/1974 Moquin et al. .............. 446/142
4,884,974 A 12/1989 DeSmet
5,167,508 A 12/1992 Mc Taggart
5,419,705 A 5/1995 Sandvik
5,437,552 A 8/1995 Baer et al.
5,453,013 A 9/1995 Billings et al.
5,466,158 A * 11/1995 Smith, III .................... 434/317
5,485,176 A 1/1996 Ohara et al.
5,511,980 A 4/1996 Wood
5,531,600 A 7/1996 Baer et al.
5,574,519 A 11/1996 Manico et al.
5,575,659 A 11/1996 King et al.
5,603,652 A * 2/1997 Rothschild et al. .......... 446/130
5,636,995 A 6/1997 Sharpe, III et al.
5,679,049 A * 10/1997 Arad et al. .................. 446/142

(Continued)

FOREIGN PATENT DOCUMENTS

WO    WO 87/06752 A1    11/1987

OTHER PUBLICATIONS

"Fundamentals of Reading: A Parent's Guide to using the Record 'n Learn™ Pad learning toy;" 9 pages; VTECH.

*Primary Examiner*—Cameron Saadat
*Assistant Examiner*—Kang Hu
(74) *Attorney, Agent, or Firm*—Townsend and Townsend and Crew LLP

(57) ABSTRACT

An electrographic position location apparatus and a data cartridge are disclosed. The data cartridge comprises a body and a memory device in the body. A connector extends from the body and is coupled to the memory device. A microphone is attached to or is incorporated within the body.

11 Claims, 24 Drawing Sheets

U.S. PATENT DOCUMENTS

| | | |
|---|---|---|
| 5,707,240 A | 1/1998 | Hass et al. |
| 5,888,070 A | 3/1999 | La Tour et al. |
| 6,028,556 A * | 2/2000 | Shiraki .................. 343/702 |
| 6,148,173 A | 11/2000 | Bell |
| 6,167,233 A | 12/2000 | Gresser, Jr. et al. |
| D436,100 S * | 1/2001 | Taylor et al. ............ D14/226 |
| 6,246,570 B1 * | 6/2001 | Kim .................. 361/679.23 |
| 6,305,732 B1 * | 10/2001 | Ruhl .................... 296/70 |
| 6,421,524 B1 * | 7/2002 | Padgett .................. 434/317 |
| 6,516,181 B1 * | 2/2003 | Kirwan .................. 434/317 |
| 6,608,618 B2 | 8/2003 | Wood et al. |
| 6,641,401 B2 | 11/2003 | Wood et al. |
| 6,661,405 B1 * | 12/2003 | Flowers .................. 345/173 |
| 6,668,156 B2 * | 12/2003 | Lynch et al. ............ 434/317 |
| 7,035,091 B2 * | 4/2006 | Le et al. ............ 361/679.03 |
| 2002/0054029 A1 * | 5/2002 | Glancy et al. ............ 345/173 |
| 2003/0162162 A1 | 8/2003 | Marggraff |

* cited by examiner

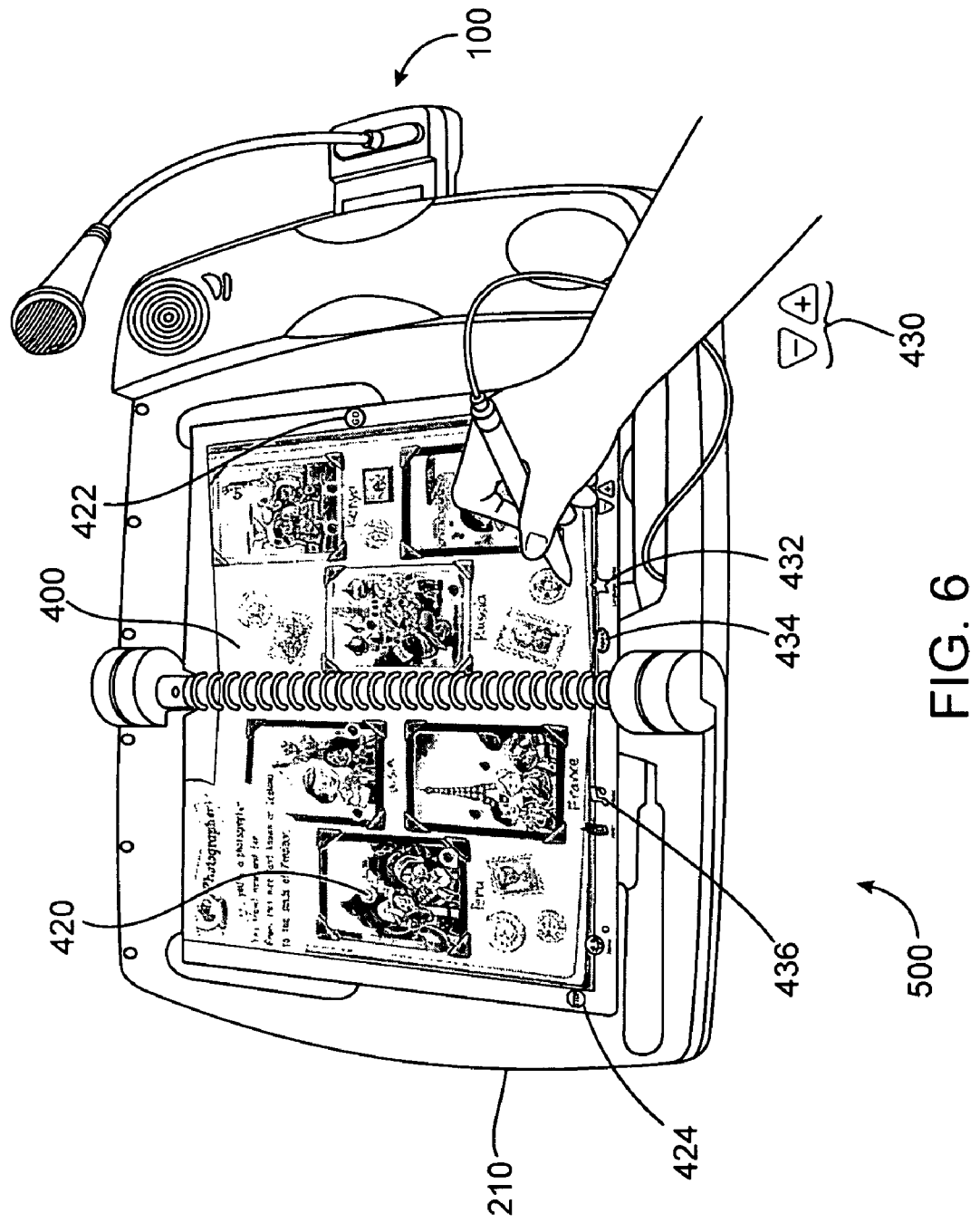

ELECTROGRAPHIC POSITION LOCATION APPARATUS INCLUDING RECORDING CAPABILITY AND DATA CARTRIDGE INCLUDING MICROPHONE

CROSS-REFERENCES TO RELATED APPLICATIONS

This patent application is a non-provisional of and claims the benefit of the filing date of U.S. Provisional Patent Application No. 60/512,275, filed on Oct. 17, 2003, U.S. Provisional Patent Application No. 60/487,440, filed on Jul. 14, 2003, and U.S. Provisional Patent Application No. 60/437,770, filed on Jan. 3, 2003. All of these U.S. Provisional Patent Applications are herein incorporated by reference in their entirety for all purposes.

BACKGROUND OF THE INVENTION

Electrographic position location apparatuses are known. One such apparatus was made by V-Tech and was called the Record 'n Learn Pad. This product had a pad and a pen. The pen was coupled to the pad with a cable.

A book was disposed on the pad when the pad was in use. The pen was used to select words in the book. After selecting words, audio for the selected words could be heard through a speaker in the pad. The pad also had a separate microphone and record button. When a user depressed the record button, the user's voice was recorded. Recording was in progress when a red light on the pad illuminated. To play back the recorded voice, the user could press a play button on the pad or select a "play" icon in the book with the pen.

While the above described electrographic position location apparatus is useful, a number of improvements can be made. For example, in the above-described apparatus, a user could only record a voice and then play it back. There was no ability to integrate the user's voice into a unique passage such as a story or into a game. Accordingly, the apparatus did not use the user's voice in a manner, which was interesting to the user.

In addition, the microphone and the record button in the Record 'n Learn Pad were physically integrated into the pad in a manner that made the microphone difficult to use. The microphone was located in a position flush with the surface of the platform so a user tended to bend down and speak with his or her mouth near the platform surface. This recording position is physically awkward for the user and results in poor recording quality because frequently the user is either to close or too far away from the microphone and the user's diction is compromised by the physically awkward position.

Also, in some instances, the user may not want to use the microphone and may simply want to use the apparatus to electronically read a book without using the record function. If the user does not want to use the record function, the bulky microphone-containing apparatus must still be used. In some circumstances, it would be more desirable if the user had the ability to choose whether or not to use a microphone with the above-described pad.

Other toys have allowed a child to record his or her name, and then hear his or her name played back when the toy is first used. For example, after recording his voice, a toy may say start a play process by saying "Hi (name)! Let's play". However, although such toys can intersperse preprogrammed audio with user-recorded words, the level of interaction is limited. It would also be desirable if a user could interact with a toy to a greater extent and in a more interesting way than just using the user's name. It would be desirable if the user could hear his or her voice along with pre-recorded audio, for example, in a story or game.

Embodiments of the invention address these and other problems, individually and collectively.

SUMMARY OF THE INVENTION

Embodiments of the invention are directed to data cartridges including microphones, electrographic position location apparatuses including data cartridges with microphones, and electrographic position location apparatuses including unique recording functions. Kits including the data cartridges and print media are also disclosed.

One embodiment of the invention is directed to a data cartridge comprising: (a) a body; (b) a memory device in the body; (c) a connector extending from the body and coupled to the memory device; and (d) a microphone attached to or incorporated within the body.

Another embodiment of the invention is directed to a data cartridge comprising: (a) a plastic body; (b) a connector extending from the body; (c) a first memory device in the body storing code for audio outputs for print elements in a print medium; (d) a microprocessor in the body; (e) a microphone electrically coupled to the microprocessor; (f) a connector extending from the body and coupled to the memory device and the microprocessor; (g) a second memory device coupled to the microprocessor, wherein the second memory device is adapted to store code for the user's voice; (h) a dummy microphone including a head portion and a neck, wherein the neck is coupled to the body; and (i) an illumination source in the head portion of the dummy microphone, and being electrically coupled to the microprocessor.

Another embodiment of the invention is directed to an electrographic position location apparatus comprising: (a) a platform including a first connector and a surface, the surface capable of receiving a print medium; (b) a data cartridge comprising (i) a body, (ii) a memory device in the body, (iii) a second connector extending from the body and coupled to the memory device, and (iv) a microphone attached to or incorporated within the body, wherein the first and second connectors are connectable to each other.

Another embodiment of the invention is directed to an electrographic position location apparatus comprising: (a) a platform comprising a surface; (b) a print medium suitable for placement on the surface, wherein the print medium comprises a record print element and a playback print element, wherein the playback print element is present along with other print elements that together are used to form a unique passage, wherein the unique passage is used in a story or a game; (c) a plurality of electrical elements in the platform and under the surface; (d) a microprocessor coupled to the plurality of electrical elements; (e) a memory device coupled to the microprocessor, wherein the memory device comprises code for recording a user's voice, code for storing the user's recorded voice, code for playing back the user's voice, and code for providing sounds associated with the other print elements; and (f) an audio output device coupled to the microprocessor.

Another embodiment of the invention is directed to a kit for use in an electrographic position location apparatus, the kit comprising: (a) a print medium including a record print element; (b) a data cartridge including (i) a body, (ii) a memory device in the body, (iii) a connector extending from the body and coupled to the memory device, and (iv) a microphone attached to or incorporated within the body.

Another embodiment of the invention is directed to a method of interacting with a print medium, the method comprising: (a) placing a print medium on a platform including a surface, a plurality of electrical elements under the surface, and a speaker, wherein the print medium comprises a record print element, a playback print element, and additional print elements; (b) selecting the record print element; (c) speaking into a microphone to record a voice; (d) selecting the playback print element, wherein the playback print element causes a speaker in the platform to play back the user's voice along with audio corresponding to the additional print elements. The audio corresponding to the print elements and the user's recorded voice may be used in a story or a game.

Yet another embodiment of the invention is directed to a data cartridge comprising: (a) a body; (b) a first connector extending from the body; (c) a second connector extending from the body; (d) a microphone attached to or incorporated within the body; and (e) a memory device coupled to the second connector, wherein the first connector is for connecting the data cartridge to an external connector.

Another embodiment of the invention is directed to an electrographic position location apparatus comprising: (a) a platform comprising a surface; (b) a print medium including a print element, wherein the print medium is capable of being received on the platform; (c) a plurality of electrical elements in the platform and under the surface; (d) a microprocessor coupled to the plurality of electrical elements; (e) a memory device coupled to the microprocessor, wherein the memory device comprises code for recording a user's voice, code for storing the user's recorded voice, and code for playing back the user's voice; (f) an audio output device coupled to the microprocessor; and (g) a microphone structure coupled to the housing, wherein the microphone structure comprises a head portion and a neck.

Another embodiment of the invention is directed to a toy comprising: (a) a housing having a display screen; (b) a plurality of electrical elements in the housing and under the display screen; (d) a microprocessor coupled to the plurality of electrical elements; (e) a memory device coupled to the microprocessor, wherein the memory device comprises code for recording a user's voice, code for storing the user's recorded voice, code for playing back the user's voice, and code for generating one or more images on the display screen; (f) an audio output device coupled to the microprocessor; and (g) a microphone structure coupled to the housing, wherein the microphone structure comprises a head portion and a neck.

These and other embodiments of the invention are described in further detail below in the Detailed Description with reference to the Figures.

BRIEF DESCRIPTION OF THE DRAWINGS

FIG. 6 shows a perspective view of an electrographic position location apparatus including a book and a data cartridge including a microphone.

In the Figures, like numerals designate like elements.

DETAILED DESCRIPTION

Figure 1A:
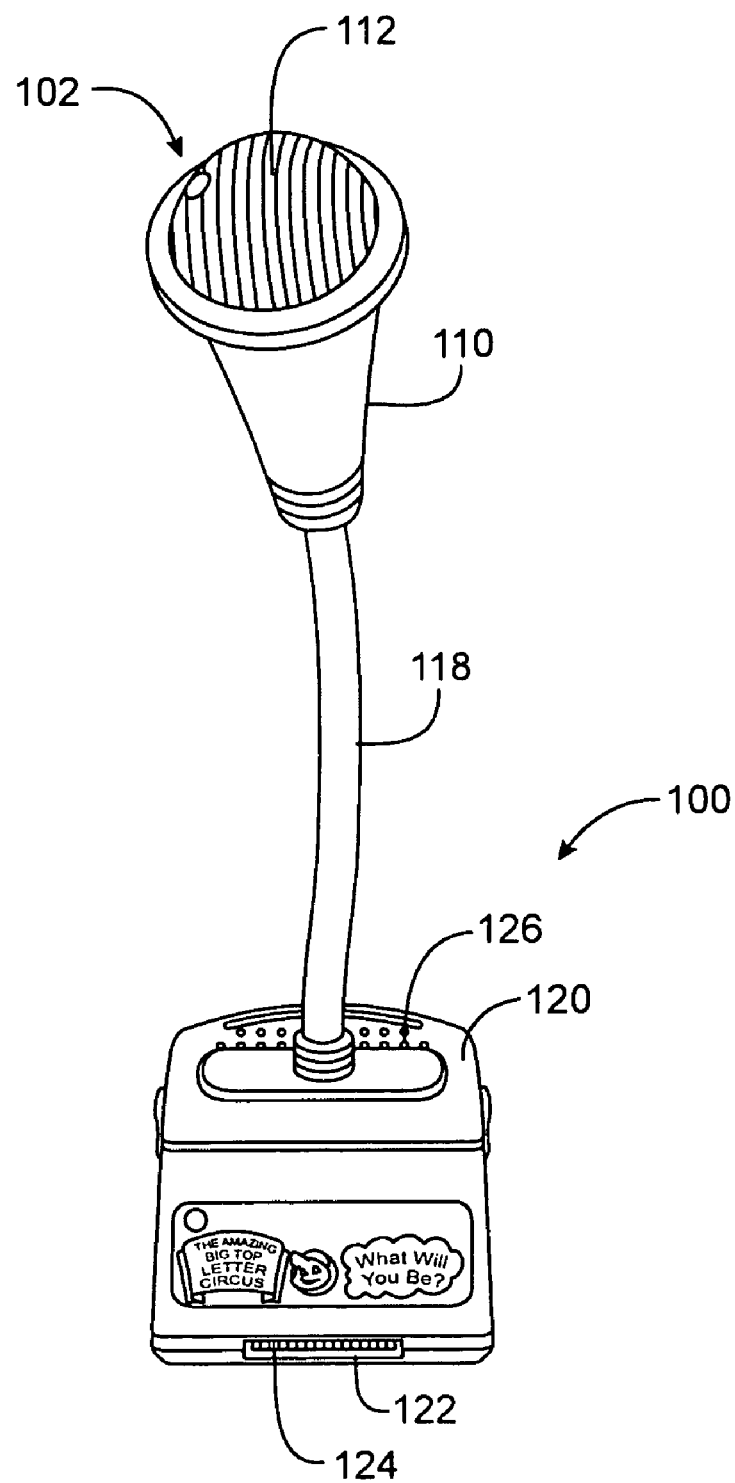
FIG. 1(a) shows a data cartridge including a microphone according to an embodiment of the invention from a front view.

Some embodiments of the invention are directed to a data cartridge including a microphone. The data cartridge can be used with a platform in an electrographic position location apparatus. The electrographic position location apparatus can provide unique recording functions. Kits including the data cartridges with print media suitable for use with an electrographic position location apparatus are also disclosed.

I. Data Cartridges Including Microphones

Some embodiments of the invention are directed to data cartridges including microphones. As used herein, the term "data cartridge" includes any suitable structure or combination of structures including a memory device. A "data cartridge" according to embodiments of the invention can be of one-piece construction, or can include multiple parts, which may or may not be separable from each other. The data cartridge provides additional data to an external device through an external connector. A data cartridge generally does not have a visual output device such as a display screen or an audio output device such as a speaker. For example, in one embodiment, the data cartridge comprises a body. A memory device is in the body or is attached to the body. A connector extends from the body and is coupled to the memory device. A microphone is attached to or incorporated within the body. The microphone may be inside or outside of the body. Various examples of data cartridges according to embodiments of the invention are described below.

The data cartridges according to embodiments of the invention can be used with any suitable external device. The external device generally has greater processing power and has greater functionality than the data cartridge. For example, in some embodiments, the external device may be a platform that receives a print medium. As will be explained in further detail below, the platform may contain an array of electrical elements that correspond with particular x-y positions. The data cartridge may store code for audio outputs that correspond to those x-y positions and also corresponding x-y positions in the print medium on the platform. When a user selects a particular print element associated with a particular x-y position in a print medium when it is on the platform, an audio output associated with the print element can sound from a speaker in the platform.

The data cartridge can be coupled to the platform or uncoupled from the above-described platform through a pair of connectors. Together, the data cartridge and the platform may form an electrographic position location apparatus. Further details about electrographic position location apparatuses are provided below.

Although the description herein discusses the use of a data cartridge with an external device in the form of a platform, it is understood that other external devices can be used in embodiments of the invention. Such external devices may include toys and dolls that include a connector for connecting to the connector in the data cartridge. Some external devices are described in U.S. Patent Application No. 60/446,829, filed on Feb. 10, 2003, and No. 60/512,326, each of which is entitled "Interactive Hand Held Apparatus With Stylus". These applications are herein incorporated by reference in their entirety for all purposes. In these applications, gaming apparatus embodiments are disclosed. These gaming apparatuses include a housing and a display screen. As used herein, a "display screen" comprises an electronic display screen such as a Liquid Crystal Display (LCD). The display screen may be configured to display video such as animations or other moving images. An array of electrical elements is under the display screen. A directional button and a stylus are coupled to the housing to allow a user to input data while looking at the display screen. In addition to these components, the gaming apparatuses may include a processor, a memory unit, and a speaker. The memory unit may comprise code for educational games and the educational games may be developed using a vector-graphics based animation program such as Macromedia Flash™.

FIG. 1(a) shows a data cartridge 100 according to an embodiment of the invention. As shown in FIG. 1(a), the data cartridge 100 includes a body 120. The body 120 may comprise plastic and may have a recess 122. A connector 124 is in the recess 122. The portions of the body 120 defining the recess 122 protect the connector 124 from potential damage. In other embodiments, the connector 124 can extend from the body 120, without being in the recess 122.

The body 120 of the data cartridge 100 may have any suitable geometry. In this example, the body 120 has a square shape, but could be shaped other ways in other embodiments of the invention. In FIG. 1(a), a microphone (not shown) is inside of the body 120 and holes 126 are provided in the body 120 so that a user can speak into the microphone inside of the body 120.

In the data cartridge 100, a dummy microphone structure 110 is coupled to the body 120. The dummy microphone structure 110 includes a neck 118 and a head portion 112. The neck 118 is between a head portion 112 and the body 120.

The head portion 112 includes an illumination source 102 that is an LED (light emitting diode). The illumination source 102 could alternatively be a light bulb or other illumination source that provides light. The illumination source 102 may be used to inform the user about a particular event in the recording process. For example, the illumination source 102 may light up when the user is supposed to speak into the microphone (to prompt the user to speak). The illumination source 102 may turn off after the user is done recording the user's voice.

The illumination source 102 is electrically coupled to electronics inside of the body 120 via a thick wire (not shown) inside of the neck 118. The thick wire may be a copper wire that has a "memory" associated with it. For example, the thick wire may have a diameter of about 1 mm or more. That is, the wire is thick enough so that when the neck 118 is bent by a user, the neck 118 retains the form that it obtained after bending. This reduces the chance that the data cartridge 100 will separate from an external device such as an electronic platform if the user manipulates the dummy microphone structure. If the wire in the neck 118 is too rigid, then the movement of the neck 118 may cause the body 120 to separate from an external device such as the above-described electronic platform.

The user may not know when recording is actually being performed. The illumination source 102 can indicate to the user when the recording electronics are waiting for the user to record something, and when the recording electronics are actually recording. When the recording electronics wait for a signal, the illumination source 102 can blink on and off. Once a recording threshold is crossed (this is explained in detail below) and recording is actually being performed, the illumination source 102 remains on and does not blink. Once a predetermined amount of record time passes, the illumination source 102 turns off, indicating to the user that recording is complete. This shows that different visual cues can be given to indicate to the user that the apparatus is waiting for the user to speak, is recording, or is not recording.

Providing the dummy microphone structure 110 and the real microphone inside of the body 120 has a number of advantages. First, the dummy microphone structure 110 spaces the user's mouth an appropriate distance from the real microphone inside of the body 120. When multiple recordings are made over time, each recorded voice can have substantially the same volume. Second, children, in particular, may want to grab the neck 118 and/or the head portion 110 to manipulate the microphone. If the dummy microphone structure 110 used a real microphone, the repeated grabbing of the neck 118 and/or head portion 110 could cause thin wires inside of the neck 118 to separate from electronics inside of the body 120, thus rendering the real microphone inoperative. In the illustrated embodiment, there is at least one thick conductive wire inside of the neck 118 so that electricity is supplied to the illumination source 102. Since the conductive wire is thick (e.g., 1 mm in diameter or more), it is not likely to break. Furthermore, even if the thick conductive wire does break, the illumination source 102 would be the only device that would be rendered inoperative. The microphone inside of the body and under the microphone holes 126 would still function under these circumstances. Third, having the real microphone inside of the body 120 reduces the amount of noise that is generated, compared to having a real microphone in the dummy microphone structure 110. If a microphone moves back and forth during use, air moving through the microphone may create noise in any recording that is made. In the illustrated embodiment, the real microphone is in the body 120 and remains stationary when the data cartridge 100 is coupled to an external device. The real microphone remains stationary even though the user grabs or otherwise manipulates the dummy microphone structure 110. The real microphone does not move (or does not move very much) so that the creation of noise is minimized. Fourth, while the dummy microphone structure could be omitted in some embodiments, children enjoy pretending that they are speaking into a microphone. This makes embodiments of the invention more fun and interactive than conventional electrographic position location apparatuses.

Although the use of a dummy microphone is described above for use in a data cartridge, it could alternatively be attached to a platform in an electrographic position location apparatus in other embodiments of the invention.

Figure 1B:
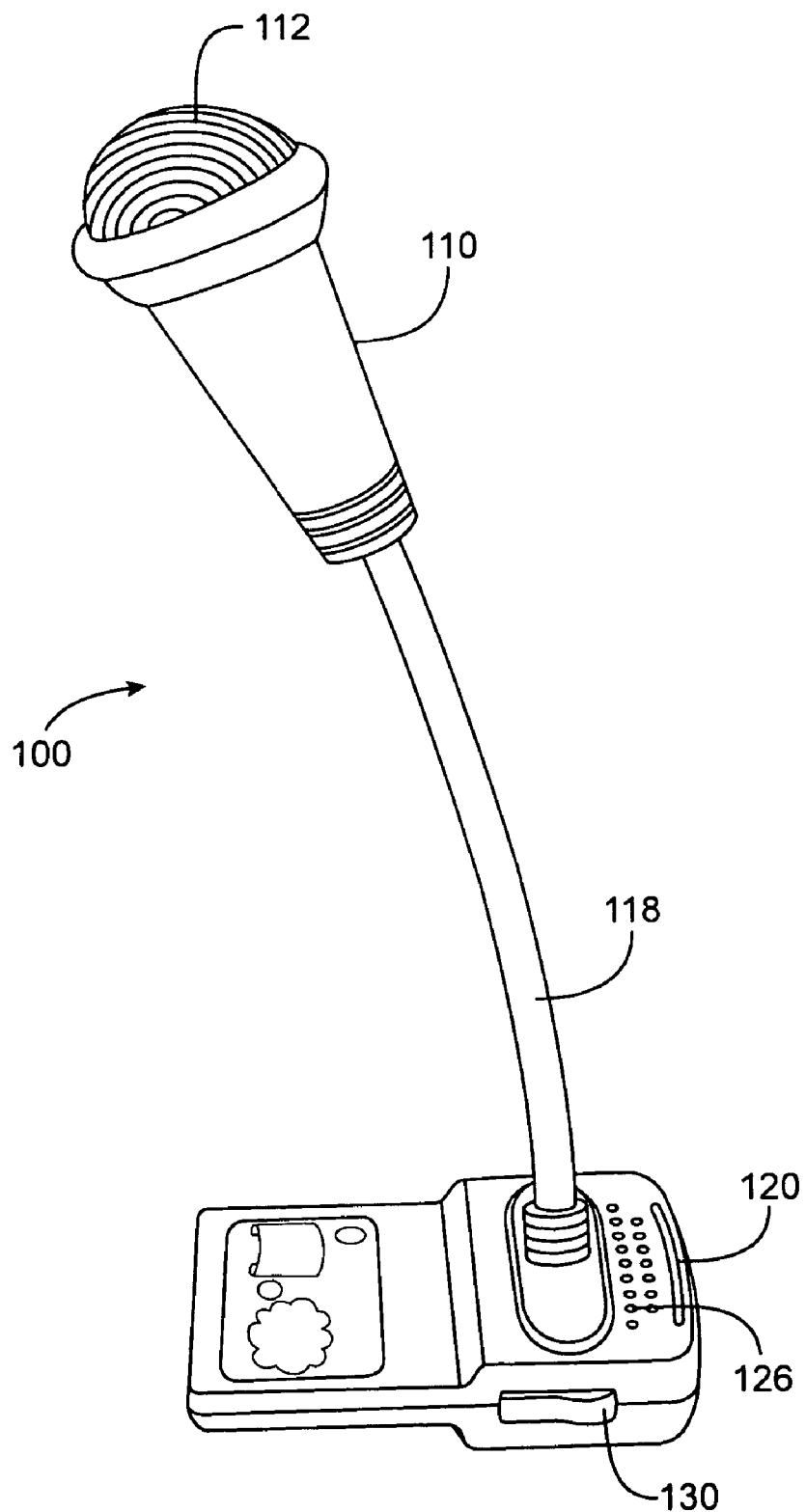
FIG. 1(b) shows the data cartridge including the microphone show in FIG. 1(a) from the side.

FIG. 1(b) shows the data cartridge 100 shown in FIG. 1(a) from a side view. As shown in FIG. 1(b), the side of the data cartridge 100 has a release member 130. Another release member (not shown) can be on the opposite side of the body 120. The release member 130 may be in the form of a depressible button. When the release member 130 is depressed, clamp members coupled to the release member 130 disengage a connector in an external device (not shown). As will be explained in further detail below, the clamp members further secure the data cartridge 100 to the external device to inhibit the easy withdrawal of the data cartridge 100 from the connector in the external device.

Figure 1C:
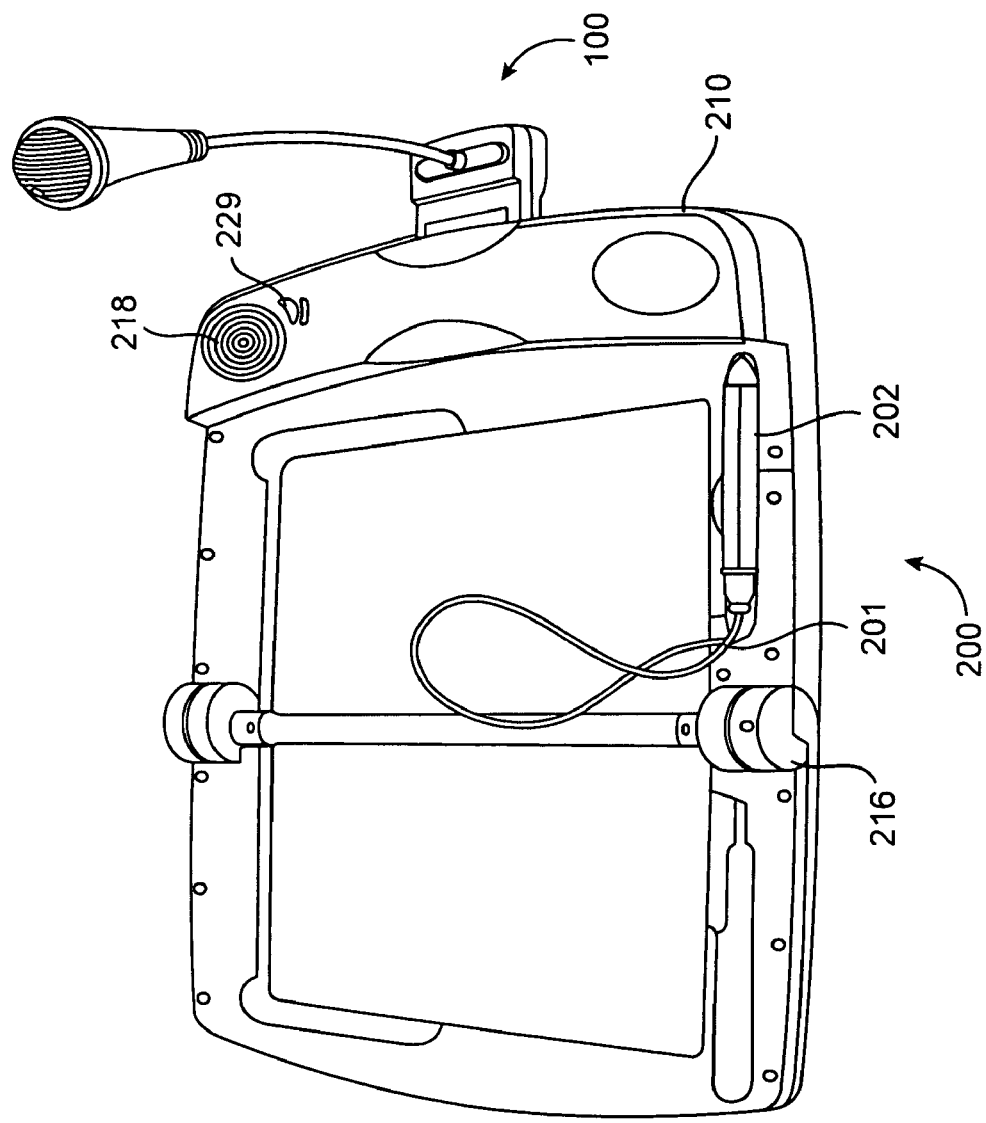
FIG. 1(c) shows an electrographic position location apparatus including the data cartridge shown in FIG. 1(a).

FIG. 1(c) shows an electrographic position location apparatus 200 including the data cartridge 100 coupled to an external device such as a platform 210. In this example, the platform 210 is foldable, and includes a major surface 214 and a hinge 216. The hinge 216 allows the platform 210 to fold upon itself when the platform 210 is not in use. As shown, a stylus 202 is coupled to the platform 210 through a cable 201. A speaker 218 and an on/off button are in the platform 210. The operation of an electrographic position location apparatus 200 of the type shown in FIG. 1(c) is described in further detail below.

Figure 2A:
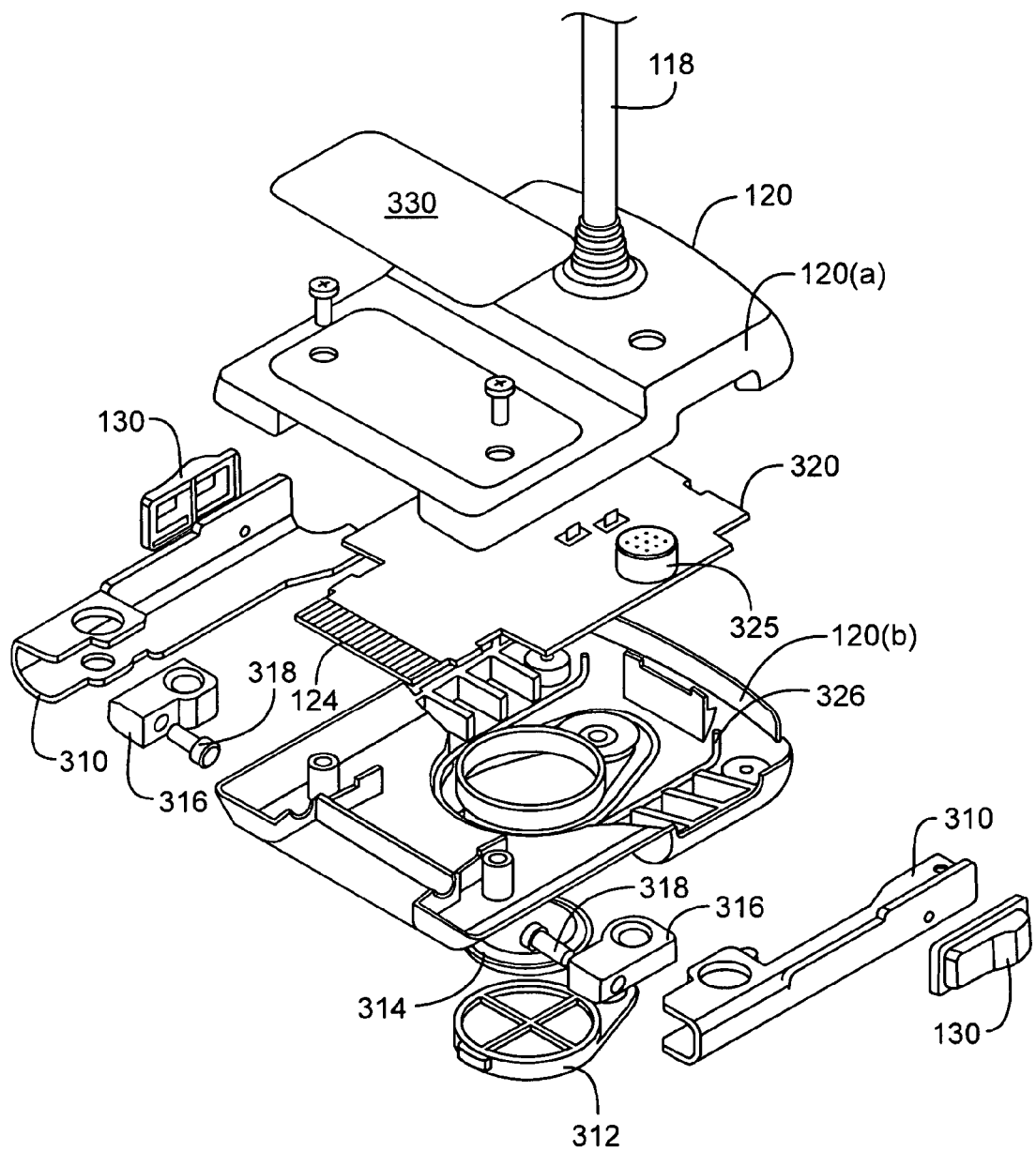
FIG. 2(a) shows an exploded view of a portion of the data cartridge from a top perspective view.

FIG. 2(a) shows an exploded view of part of a data cartridge according to an embodiment of the invention. In FIG. 2(a), the data cartridge includes upper and lower body portions 120(a), 120(b) forming the body 120. A label 330 is on the upper body portion 120(a) to identify the type of data present in the data cartridge.

A printed circuit board 320 is between the two body portions 120(a), 120(b) and is coupled thereto. The printed circuit board 320 has the connector 124, which is formed as conductive traces on the circuit board edge region. In other embodiments, conductive pins or holes could be used to form the connector 124 (e.g., an RS-232 connector).

A microphone 325 is mounted to the printed circuit board 320 and may be electrically coupled to the connector 124 (e.g., through a microprocessor). For simplicity of illustration, the circuit lines in the circuit board are not shown. A battery 314 is under the printed circuit board 320 and provides power to one or more SRAM (static random access memory) chips (not shown) inside of the body 120. The SRAM chips may be coupled to the microprocessor (not shown in FIG. 2) and may be used to store the user's recorded voice. A battery door 312 is coupled to the bottom housing 120(b) so that the user can replace the battery 314 if it runs out of power.

Release members 130 are coupled to the body 120. The release members 130 are outwardly biased by a torsion spring 326. The release members 130 can actuate sheet metal lever arms 310 when they are forced inward. Sheet metal lever arms 310 are coupled to joining members 316, which contain two clamp members 318 in the form of metal pins that are directed toward each other. In the absence of inward pressure on the release members 130, the clamp members 318 are inwardly biased to clamp onto a connector (not shown in FIG. 2) in an external device. When pressure is applied to the release members 130, the inward pressure on the clamp members 318 is reduced. The data cartridge is then easier to separate from the connector on the external device since the clamp members 318 do not clamp down on the connector. The gripping force provided by the clamp members 318 to the connector may be at least about twice the gripping force provided by the connection of the connector 124 to another connector on the external device.

Figure 2B:
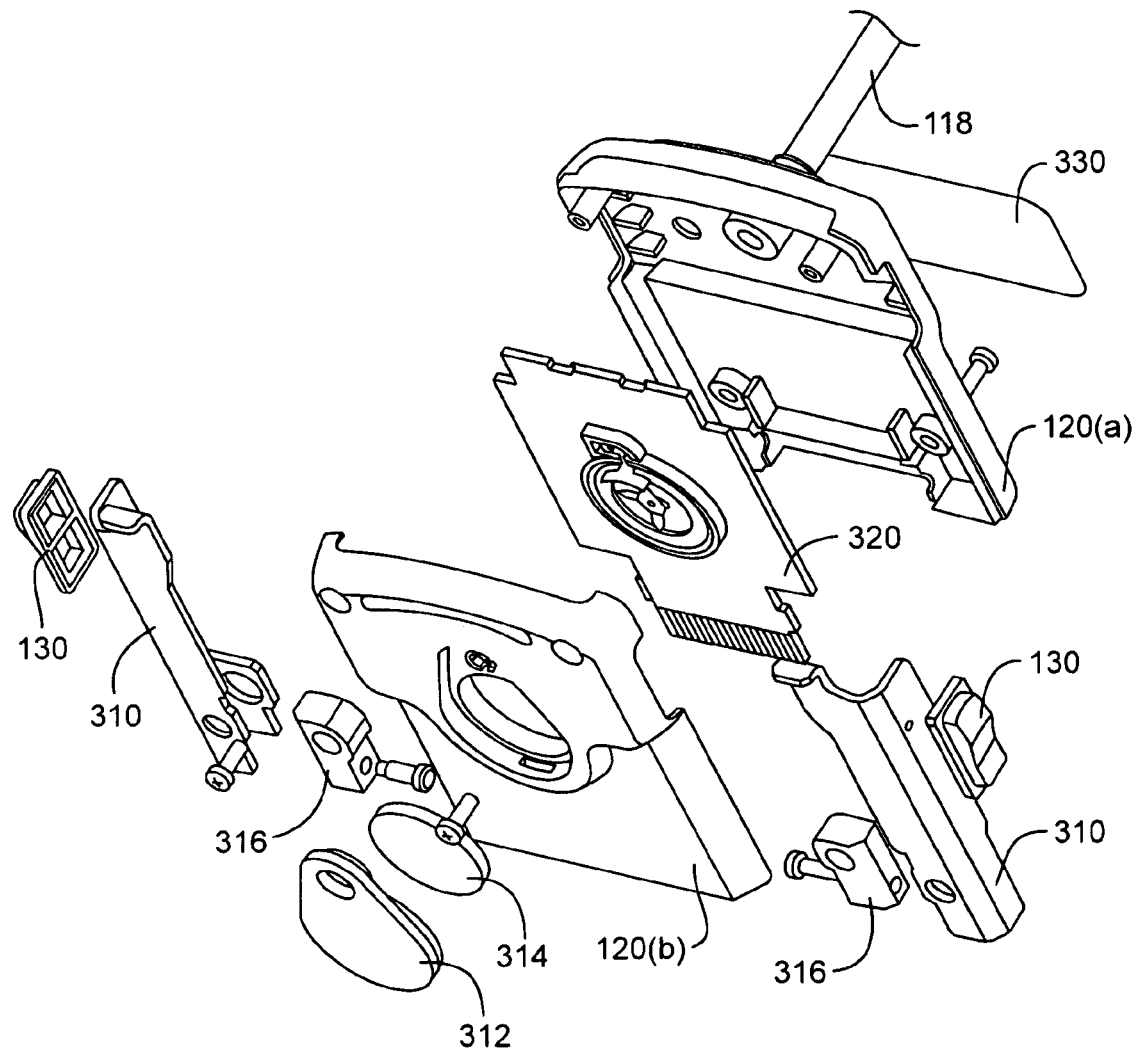
FIG. 2(b) shows an exploded view of a portion of the data cartridge from a bottom perspective view.

FIG. 2(b) shows a bottom view of the part of the data cartridge shown in FIG. 2(a). In FIG. 2(b), like numerals designate like elements as shown in FIG. 2(a). In FIG. 2(b), the underside of the printed circuit board 320 is shown more clearly. The printed circuit board 320 has a vertical conductive path that allows the battery 314 to supply power to the LED in the head portion via the conductive wire in the neck 118.

Figure 3:
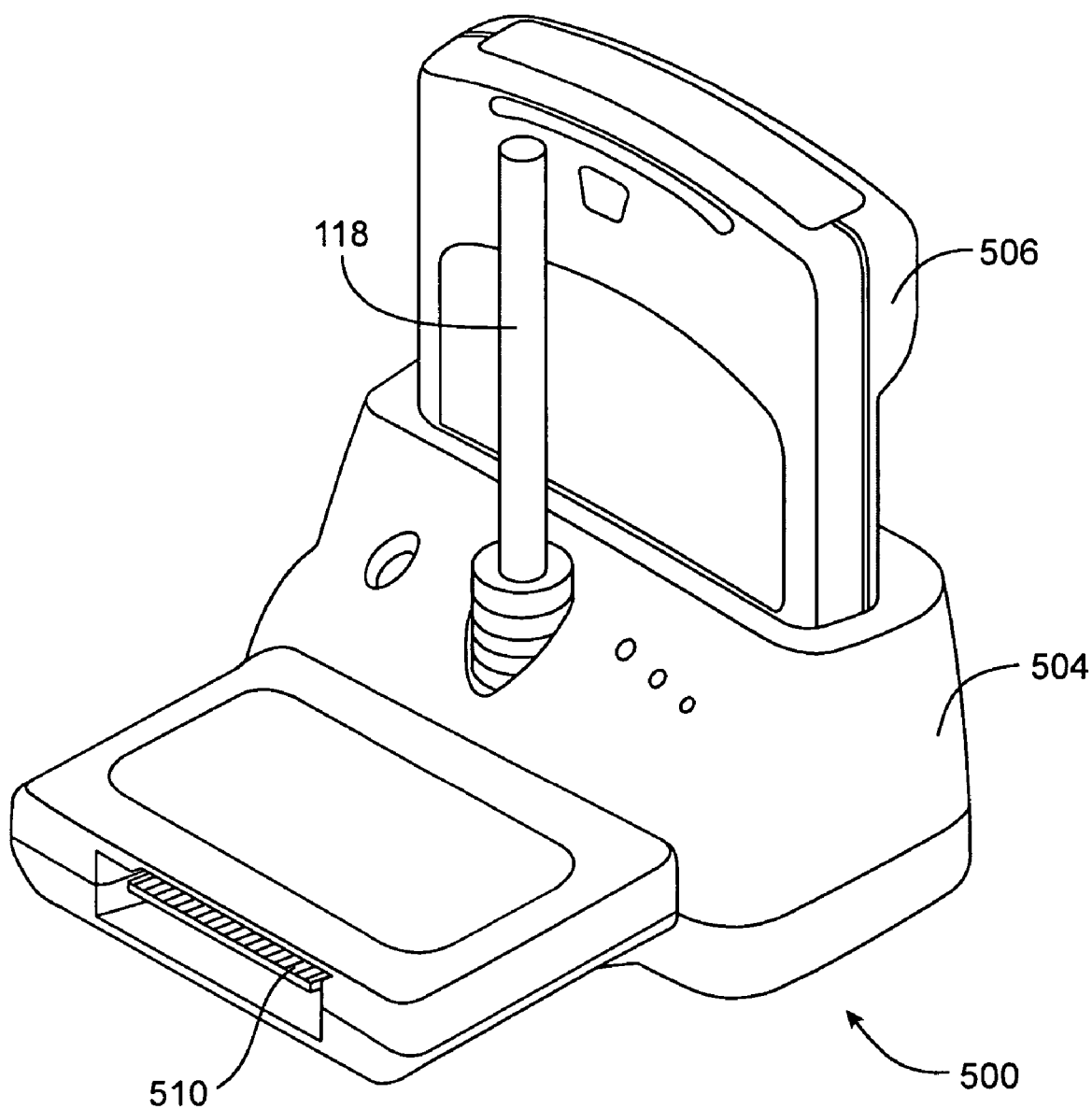
FIG. 3 shows a perspective view of a data cartridge including two parts including a microphone part and a memory structure part.

FIG. 3 shows another data cartridge 500 according to an embodiment of the invention. In this example, the data cartridge 500 has a two-piece construction including a first part 504 and a second part 506. The first part 504 may include a memory device such as a ROM and may be separable from the first part 504. The first part 504 may include an internal microphone, recording electronics, and the dummy microphone structure described above and below.

The embodiment in FIG. 3 allows a user to use the first part 504 with different second parts with respectively different memory devices containing respectively different stories, games, etc. This advantageously allows a user to use one microphone with different memory devices.

Figure 4:
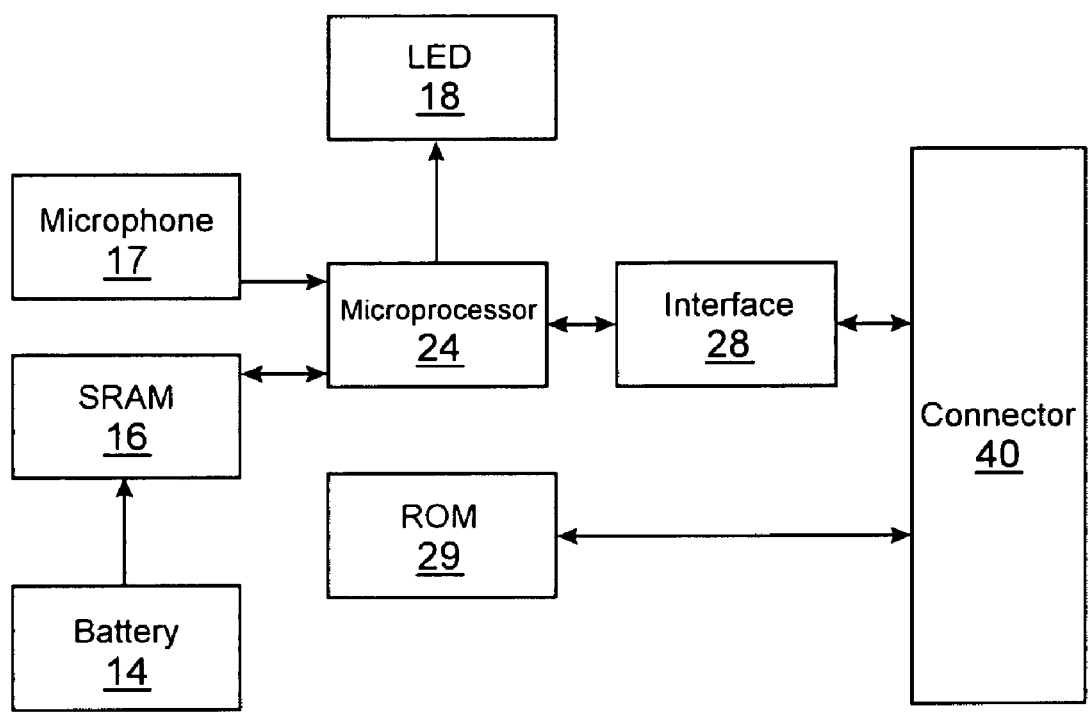
FIG. 4 shows a block diagram of some components of the data cartridge.
Figure 5A:
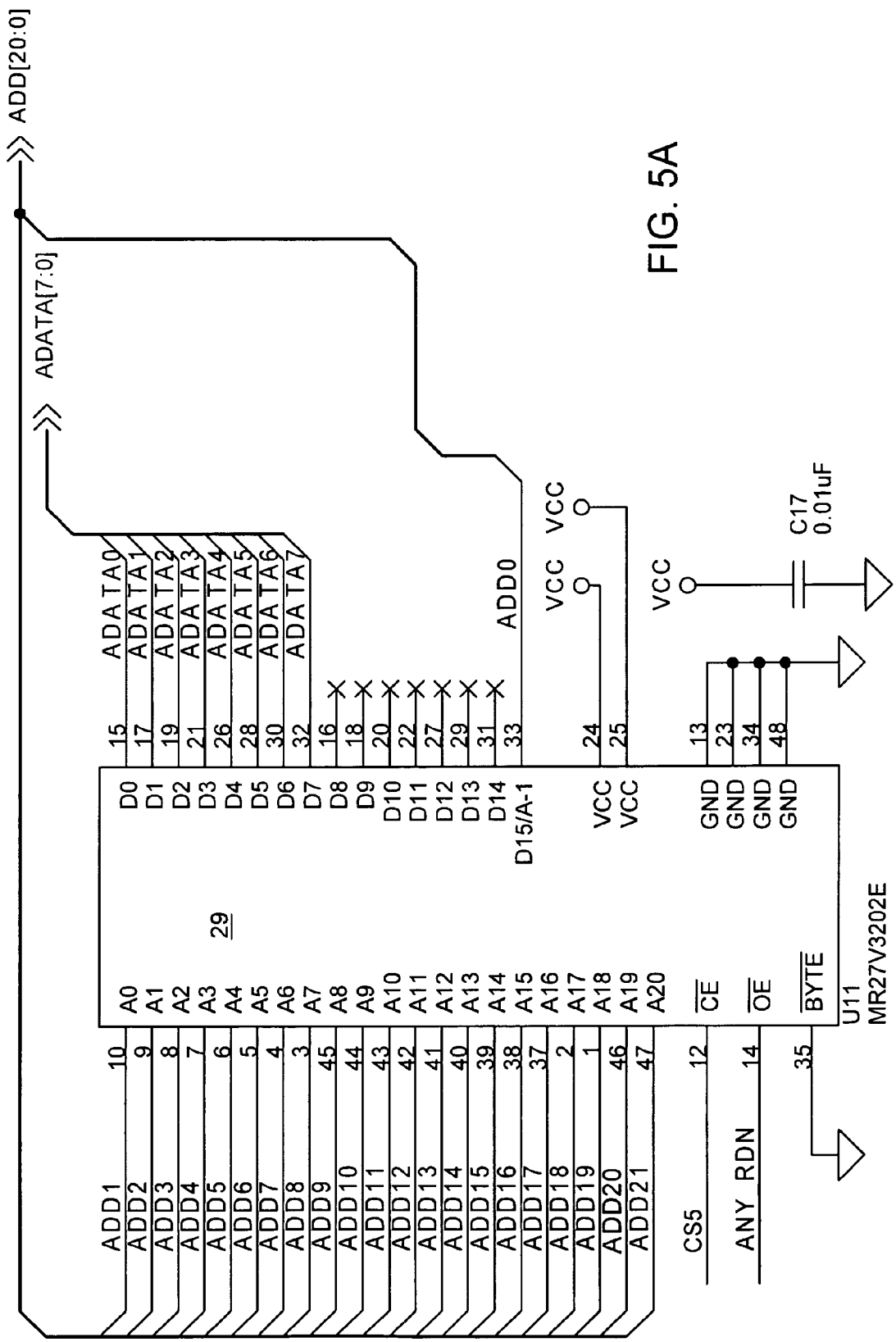
FIGS. 5A-5J shows an exemplary electrical schematic diagram for a data cartridge embodiment.
Figure 5B:
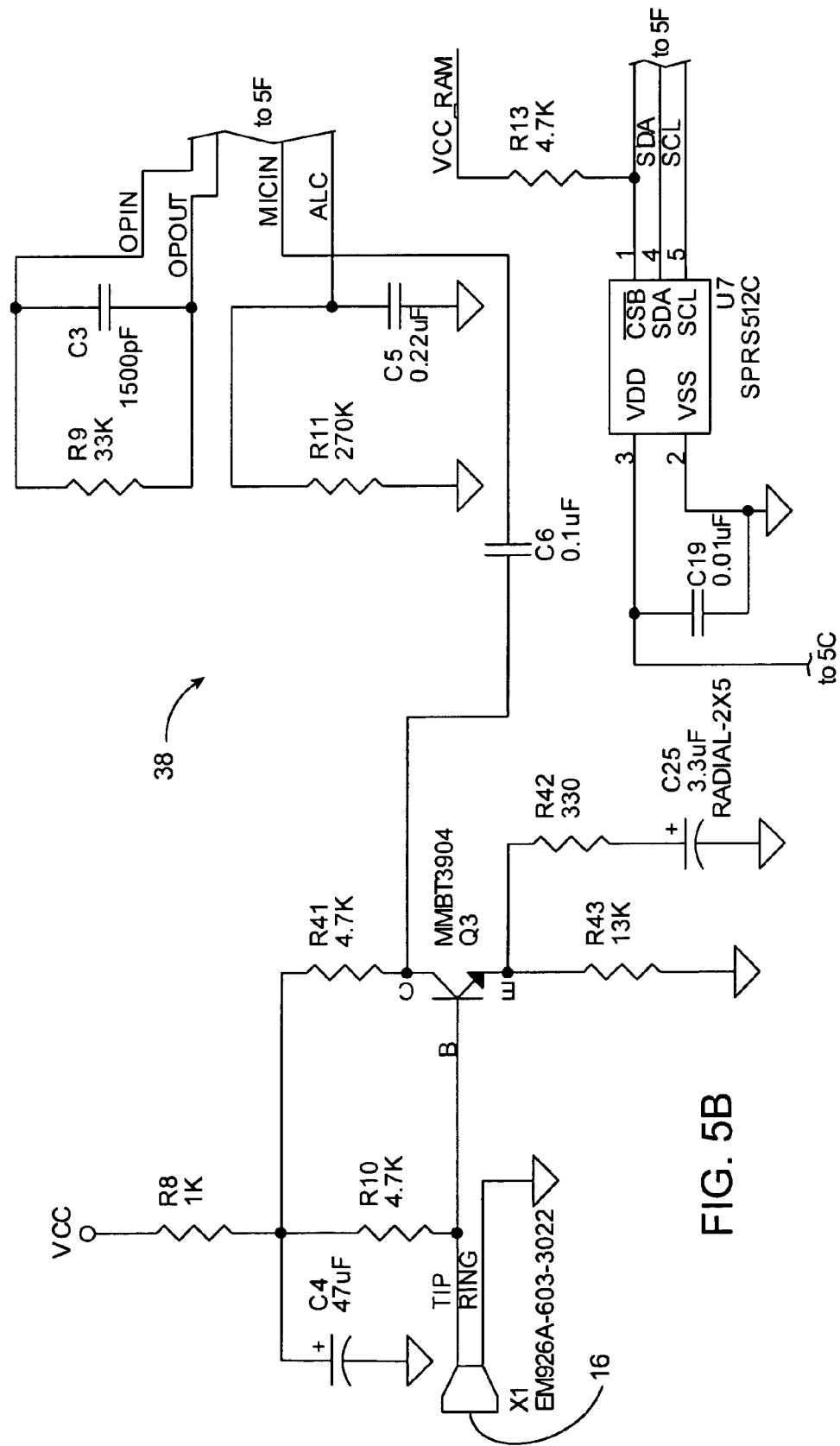
Figure 5C:
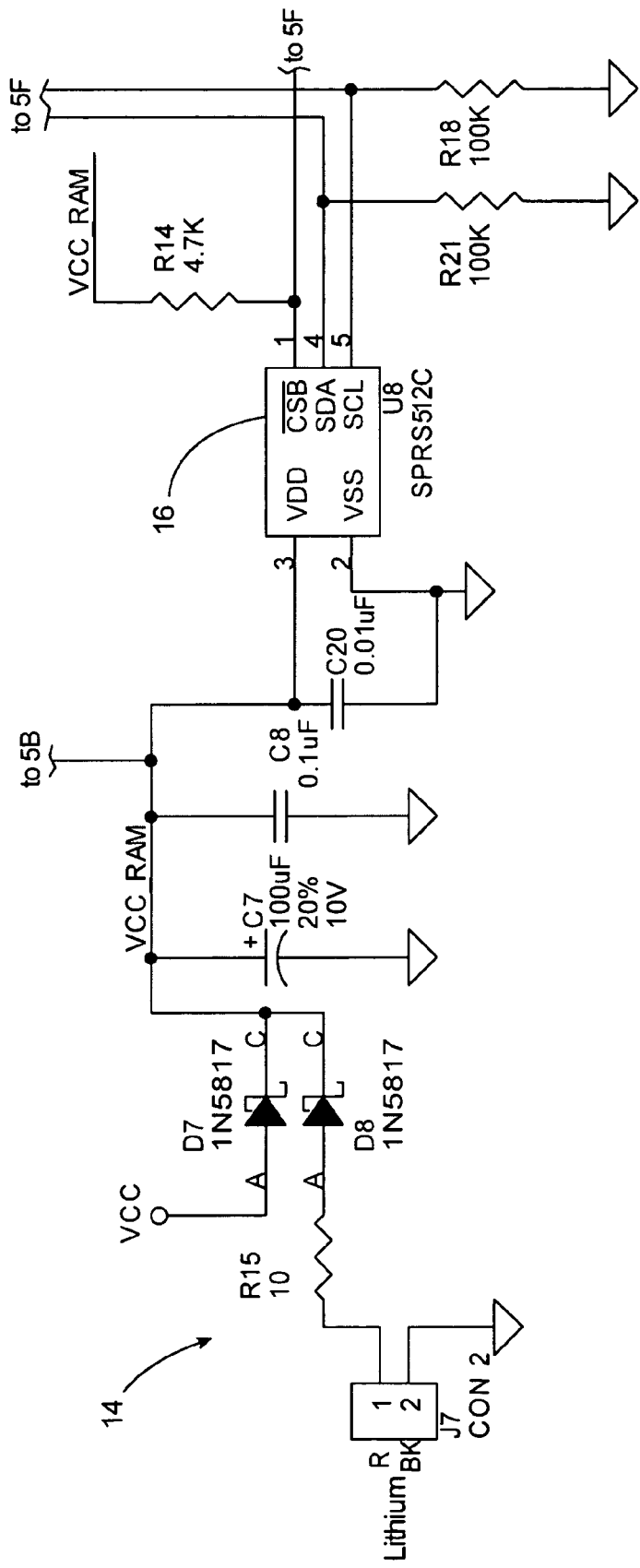
Figure 5D:
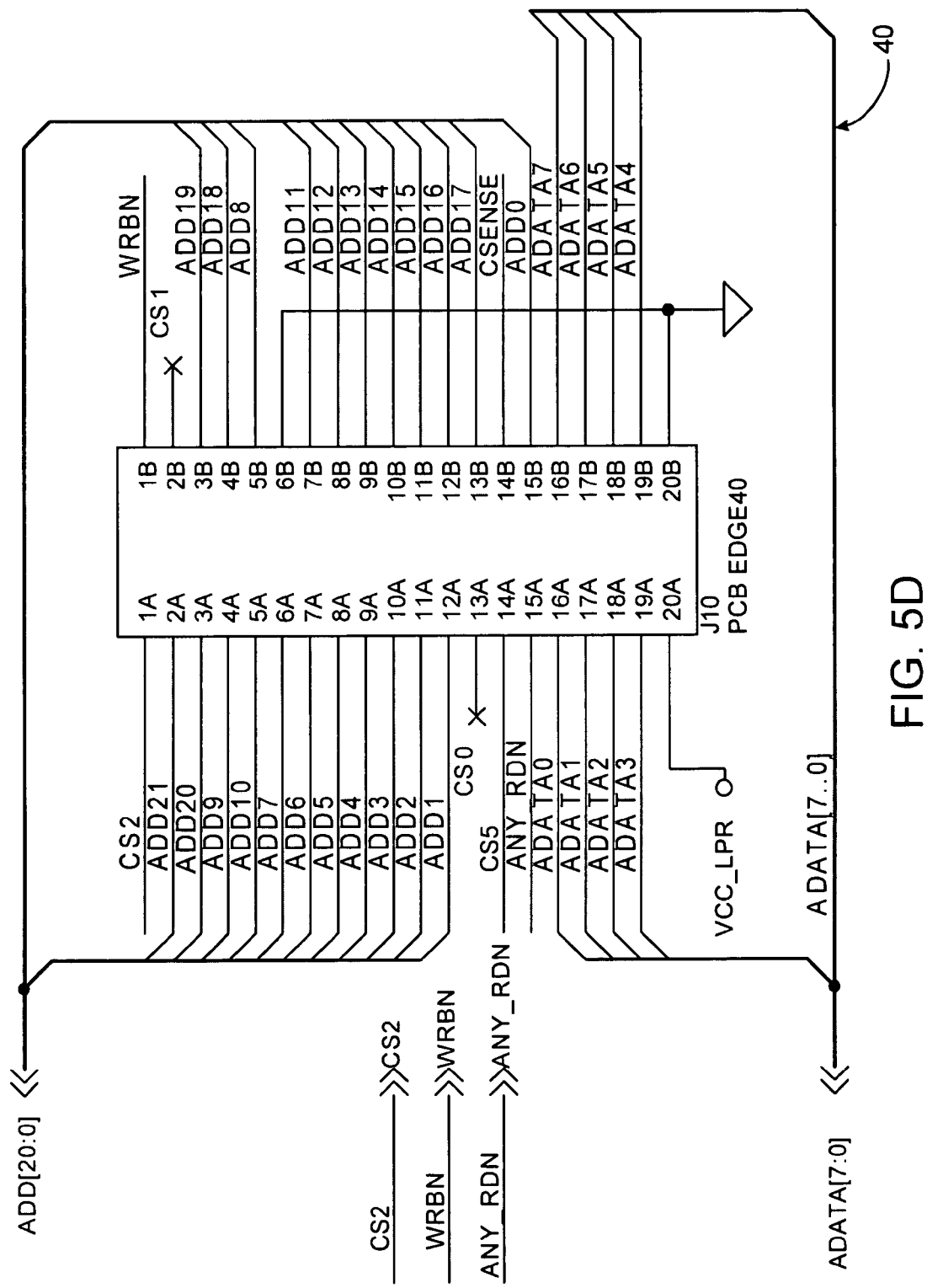
Figure 5E:
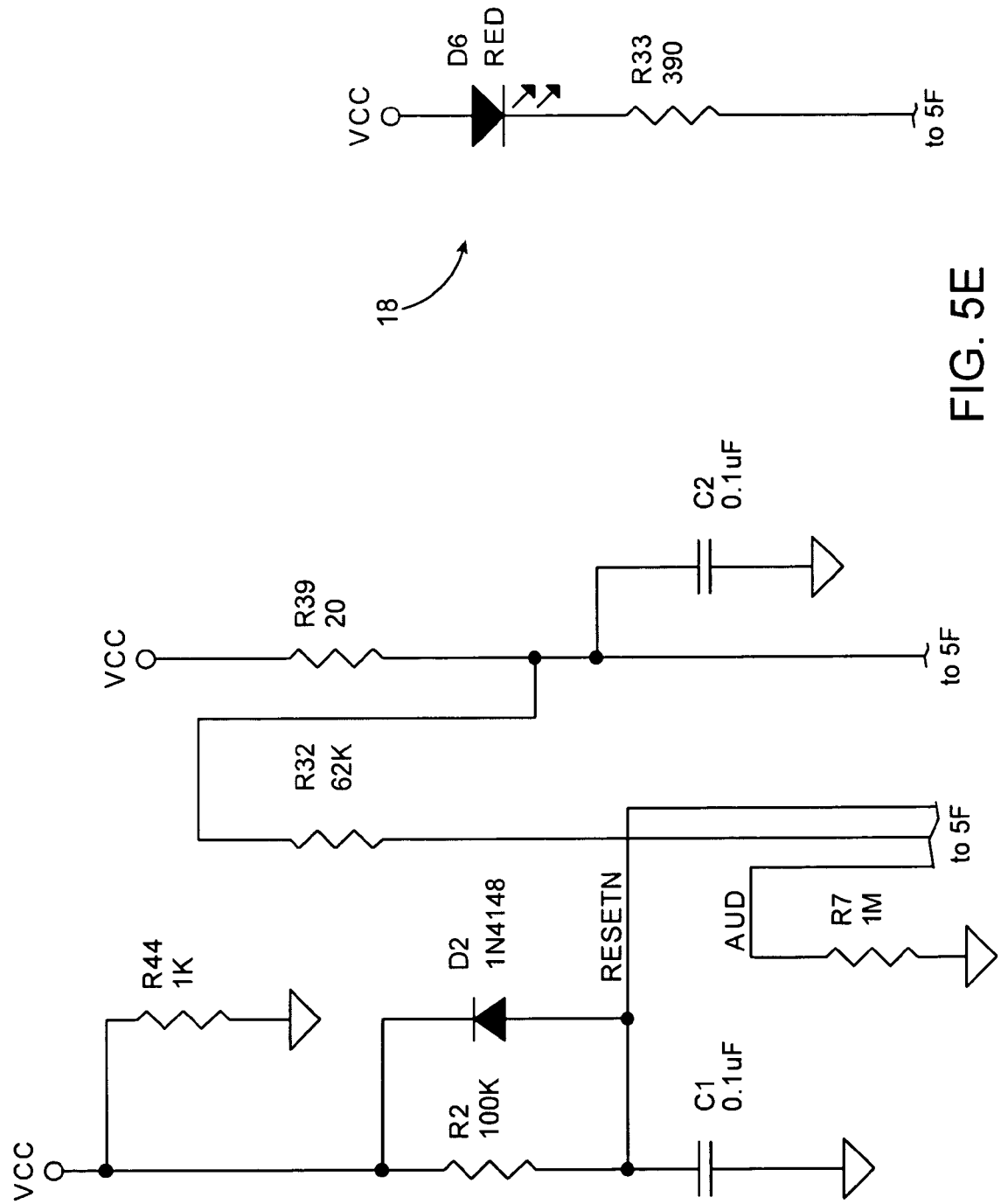
Figure 5F:
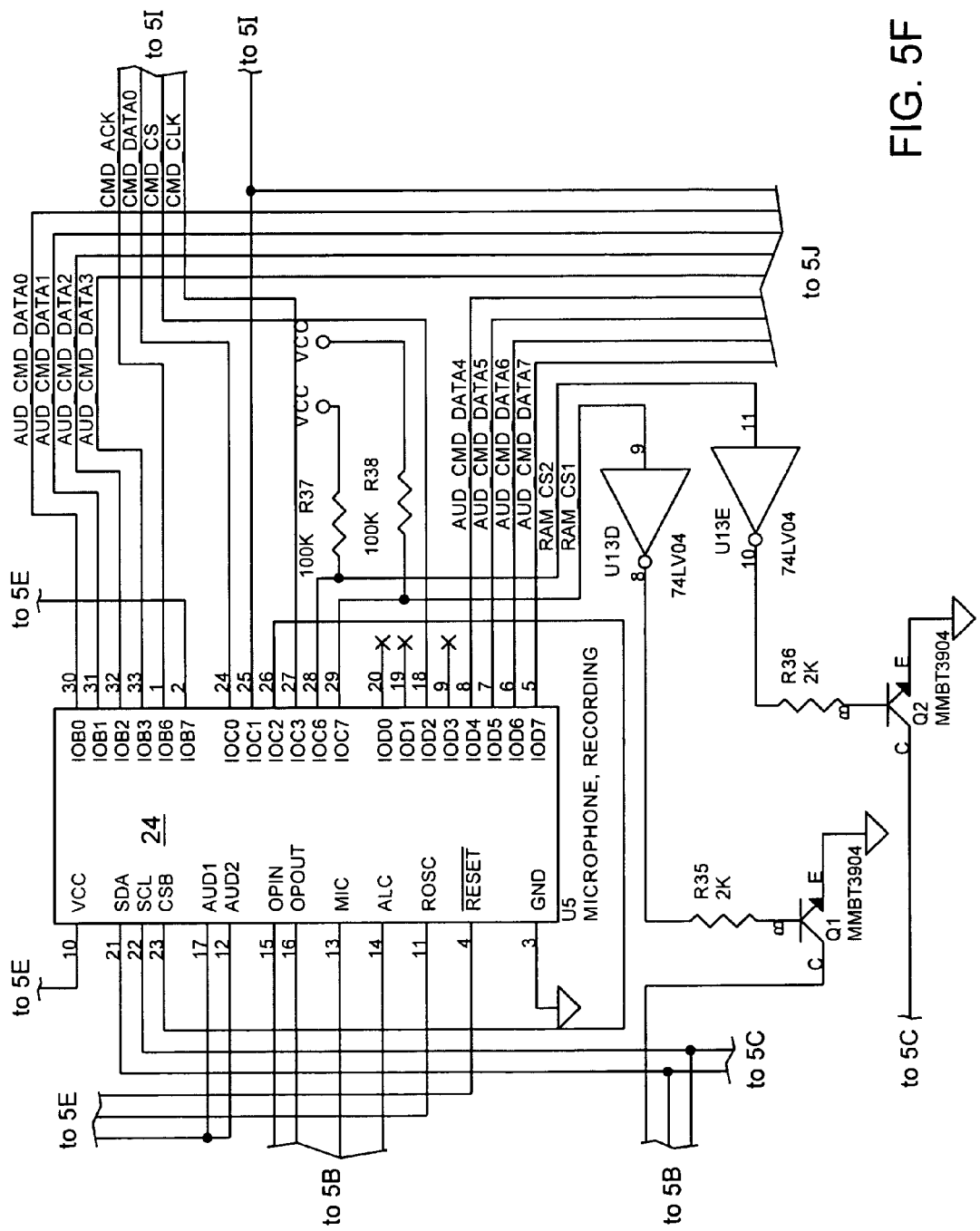
Figure 5G:
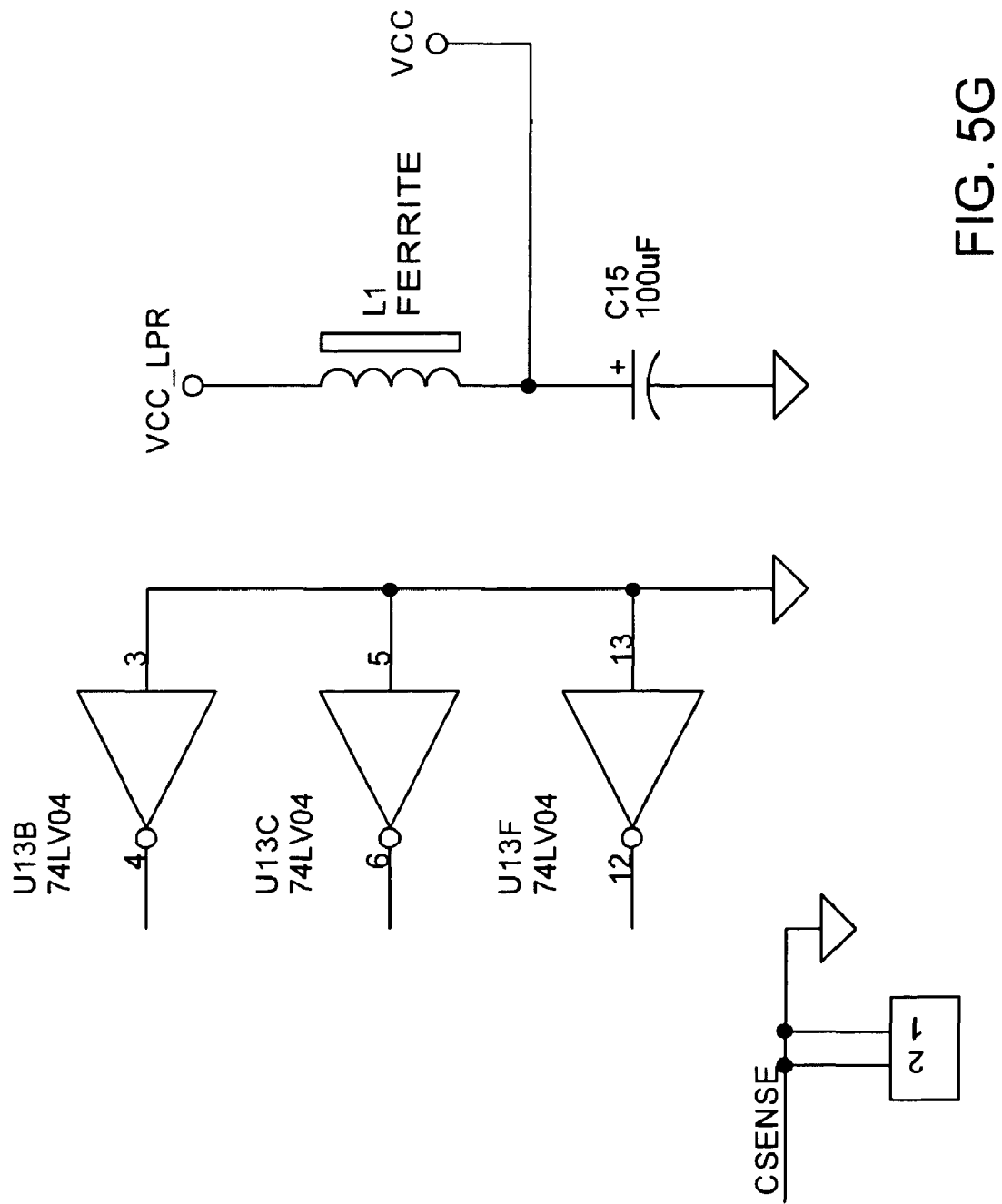
Figure 5H:
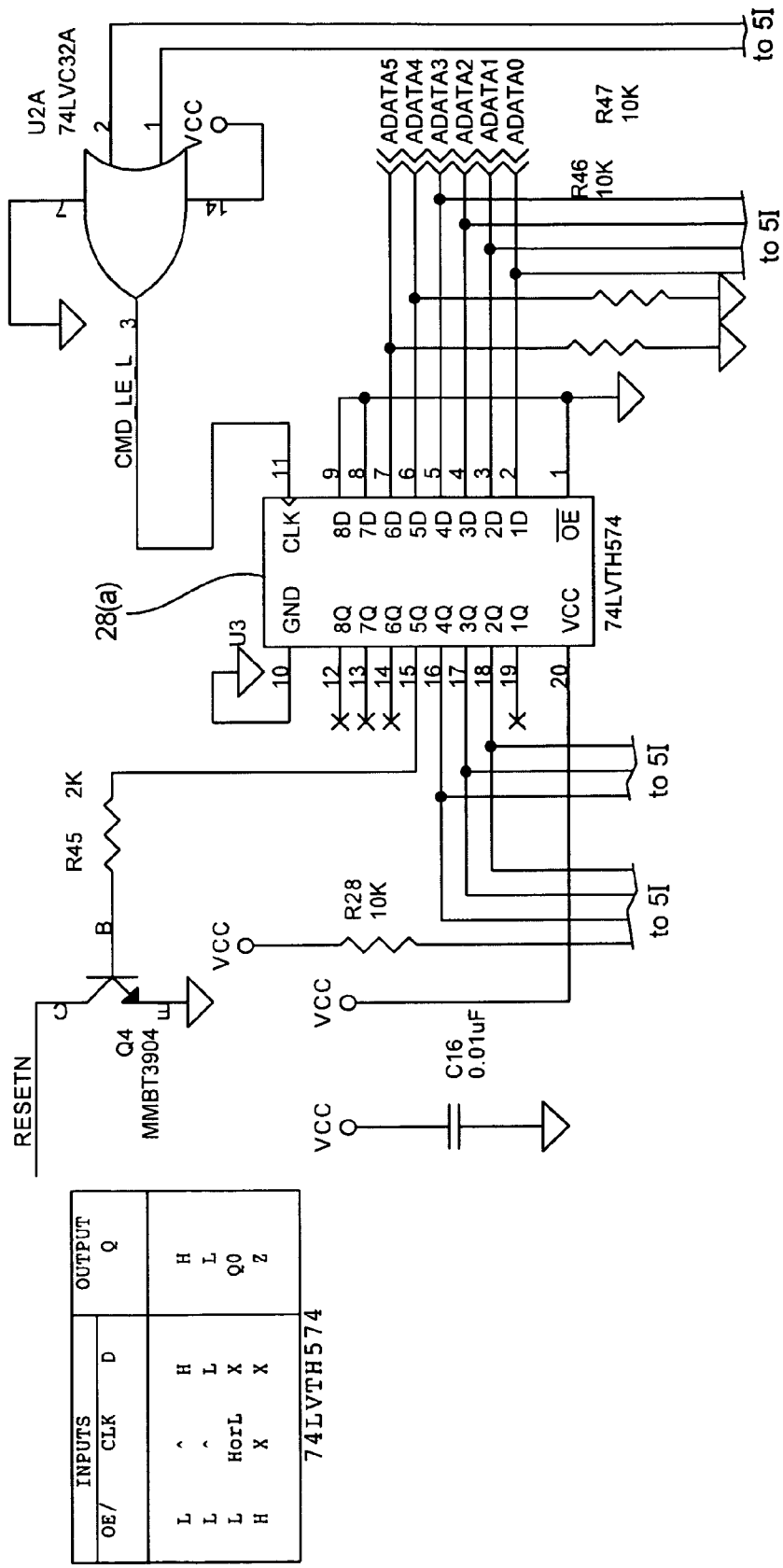
Figure 5I:
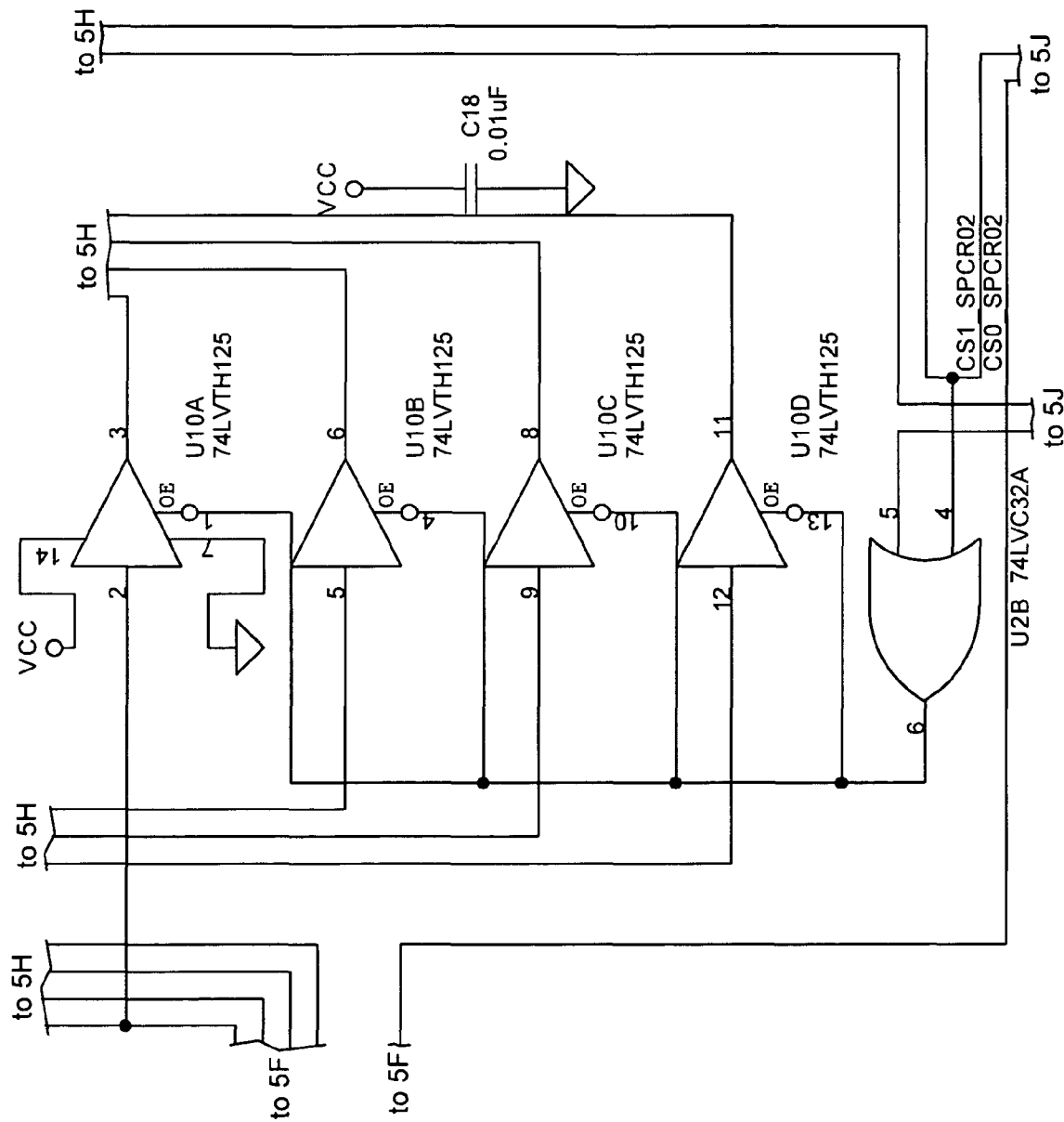
Figure 5J:
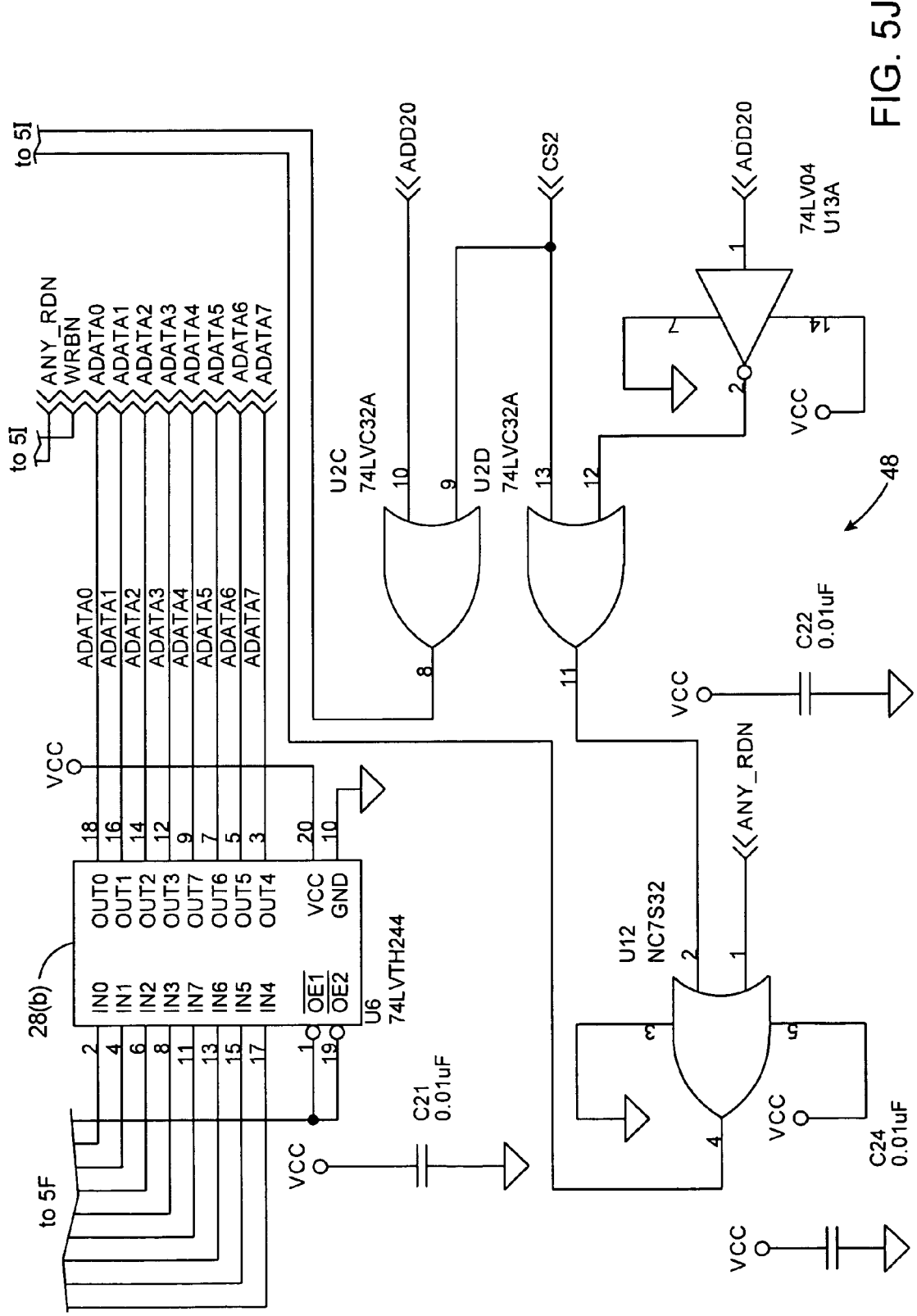

FIG. 4 shows a block diagram of some electrical components in a data cartridge (and/or electrographic position location apparatus) according to an embodiment of the invention. FIG. 4 shows a microprocessor 24 coupled to an interface 28, which is in turn coupled to a connector 40 such as an edge connector. A microphone 17 and an LED 18 are electrically coupled to the microprocessor 24. One or more SRAM chips 16 (or other memory device) and a battery 14 are also electrically coupled to the microprocessor 24. A ROM 29 (or other memory device) is also in communication with the connector 40.

As illustrated by FIG. 4, the data cartridge may include one or more memory devices, which may store code for audio or visual outputs associated with various print elements in a print medium such as a book, and/or code for the user's voice. The audio or visual outputs may include jokes, questions, words, phrases, letters, facts, music, etc. Operational code, such as code for prompting the user to record the user's voice, code for playing back the user's voice via an audio output device, code for sounding out pre-recorded audio sequences, etc. may be in the one or more memory devices. Code for performing any other function described herein can be stored in the one or more memory devices.

The one or more memory devices may comprise any suitable combination of ROMs, RAMs, SRAMs, EEPROMs, and EPROMs. For example, in FIG. 4, the ROM 29 may be a first memory device and may store code for audio for various print elements in a print medium, while the SRAM 16 may be a second memory device, which stores the user's recorded voice. In preferred embodiments, the ROM 29 stores audio data for at least two children's books. Although the ROM 29 and SRAM 16 can be first and second memory devices that are embodied by different memory chips, it is understood that the one or more memory devices in embodiments of the invention could be present on the same chip or on the same circuit board.

The user may use the above-described data cartridge in an electrographic position location apparatus. During use, the user may record certain information such as the user's name, the user's favorite food, the user's favorite toy, etc. in the data cartridge. This information can be stored in the SRAM 16 even after the electrographic position location apparatus is turned off. This can be desirable if, for example, the user is playing a game or reading a story in a book on a platform in the electrographic position location apparatus. The SRAM can store previously recorded information so that the user can pick up where the user left off at a later time. When the user uses the electrographic position location at a later time, the electrographic position location apparatus can remember the user's name and can automatically announce the user's name to the user.

Illustratively, as will be described in further detail below, a user may record user generated information such as the user's name, the user's favorite food, and the user's favorite animal using the data cartridge. This user-generated information may be played back to the user along with pre-recorded audio for words in a story or in a game. When the pre-recorded audio is played back to the user with the user-recorded information in a story, the story is personalized to the particular user. If the user decides to play back only part of the story, the user can come back at a later time to play back the rest of the story since the user-recorded information is stored in the data cartridge. Also, the data cartridge can store the user's name so that the user is greeted each time with the user's recorded name each time that data cartridge is used.

FIGS. 5A-5J shows an electrical circuit diagram according to an embodiment of the invention. Those of ordinary skill in the art can implement other circuits. In this example, the microprocessor 24 is a Sunplus SPCR02A chip, and two Sunplus SPRS512C SRAM chips 16 are electrically coupled to the microprocessor 24. These chips are commercially available from Sunplus Technologies. A lithium battery 14 supplies power to the SRAM chips 16. A microphone 17 is coupled to the microprocessor 24, via microphone pre-amplifier circuit 38. The previously described interface 28 in this example is provided by an input buffer 28(a) and an output buffer 28(b). An address decoding circuit 48 is coupled to the input and output buffers 28(a), 28(b). The microprocessor 24 is electrically coupled to the connector 40. A separate ROM chip 29 is separately coupled to the connector 40. The ROM chip 29 and the microprocessor 24 can communicate with a second microprocessor in an external device (not shown in FIGS. 5A-5J), which has a connector, which is connectable to the connector 40. The second microprocessor (not shown in FIGS. 5A-5J) can retrieve data from the ROM chip 29 and can provide instructions to the microprocessor 24.

II. Electrographic Position Location Apparatuses

Embodiments of the invention are also directed to electrographic position location apparatuses including recording capability. One embodiment of the invention is directed to an electrographic position location apparatus that includes a platform including a first connector and a surface. The surface is capable of receiving a print medium. A data cartridge connectable to the platform has (i) a body, (ii) a memory device in the body, (iii) a second connector extending from the body and coupled to the memory device, and (iv) a microphone attached to or incorporated within the body. The first and second connectors are connectable to each other so that the data cartridge and the platform can be coupled and uncoupled together by the user. Other embodiments do not need to use a data cartridge.

Suitable platforms and associated electronics for electrographic position location apparatuses are described in U.S. Pat. Nos. 5,575,659, 6,661,405 and 6,668,156. All of these patents are assigned to the same assignee as the present application and are incorporated herein by reference in their entirety for all purposes. These patents and patent applications include descriptions of a platform including electrical elements and a stylus including another electrical element coupled to the platform. The electrical elements can be signal transmitting elements or signal receiving elements. In one example, the stylus coupled to the platform includes a receiving antenna. When the stylus is positioned over a book on the major surface of the platform, the stylus receives a signal that is particular for the electrical element under the stylus. A microprocessor in the platform can determine the position of the stylus relative to the major surface. The stylus could be used to interact with print elements in the book. As described in U.S. Pat. No. 6,608,618 and U.S. patent application Ser. No. 10/457,981, filed on Jun. 9, 2003, the stylus may also include a writing element such as a pencil lead, a pen, or a crayon. In use, a user may select a print element such as a word in the book and a speech synthesizer in the platform may sound out the selected word. In other examples, the stylus may transmit a signal to electrical elements under the surface of the platform instead of receive them.

Other electrographic position location apparatuses are described in U.S. Pat. Nos. 6,641,401 and 6,608,618. In these electrographic position location apparatuses, the electrical elements under the surface of the platform are pressure switches.

The surface of the platform is suitable for receiving a print medium such as a sheet of paper, a card, a template, or a book. The book or the sheet of paper would include print elements such as words, letters, pictures, etc., which can be selected by the user.

The book may teach the user about any suitable subject including, but not limited to reading, math, writing, phonics, letter recognition, history, geography, and social studies. The book may also contain stories, games, or puzzles.

The print medium may include various print elements. The print elements may be icons, words, symbols, etc. The print elements may be selected to provide some audio feedback. For example, a print element may be the word "cat", and the selection of the word will cause the apparatus to say that word. Other print elements may be selected to change the function of the electrographic position location apparatus. For example, functional print elements may include record print elements, playback print elements, page indicator print elements, volume control print elements, game print elements, music print elements, stop print elements, etc. Other print elements are described below.

In some embodiments, the various the print elements can be over a plurality of electrical elements including a first electrical element and a second electrical element (e.g., transmitting fingers or pressure switches). The plurality of electrical elements can be under a surface of a platform. A book including a record print element and a playback print element may be on the surface. In an illustrative example of how the record print element and the playback print element could be used, the first electrical element (e.g., a conductive finger that transmits a unique electromagnetic signal) can be under the record print element and the second electrical element can be under the playback print element. A playback print element may be a narrative print element which, when selected, will play back a narrative including user recorded and non-user recorded audio. A playback print element may also be a single icon that has the same form as the record print element so that the user knows that the record and playback print elements will have the same audio associated with them. However, the record print element (or the playback print element) may have another indicator such as a red dot associated with it to indicate to a user that it is different from a corresponding playback print element. Other electrical elements can be present under other print elements. When a user interacts with the record print element and consequently with the first electrical element, a signal can be sent to the microprocessor in the data cartridge to being recording. A light in the platform or in the data cartridge (as described above) may light up to prompt the user to record the user's voice. When a user interacts with a playback print element and consequently with the second electrical element, a signal can be sent to the microprocessor in the data cartridge to play back the stored recorded sound.

FIG. 6 shows an electrographic position location apparatus 500 including a platform 210 including a surface, and a data cartridge 100 coupled to the platform 210. The data cartridge 100 may have the features described above. A stylus 422 is coupled to the platform 210. As shown in FIG. 6, the platform 210 is free of record or playback buttons so that it can be made smaller and less expensively than platforms with record and playback buttons.

A print medium 400 has been placed on the surface of the platform 210 by a user. The print medium 400 is in the form of a book with a spiral spine, but could be a book with a ring spine or a sheet of paper in other embodiments.

Various print elements may be included in the print medium 400. The print medium 400 includes a page indicator print element 422 in the form of a "Go" circle, and a stop print element 424. The user may use the stylus to select the page indicator print element 422 to indicate to the electronics inside of the platform 210 which pages are currently being displayed to the user. The user may select the stop print element 424 with the stylus to stop whatever the user is currently doing.

Other print elements including a music print element 436 in the form of a musical note, a repeat question print element 434, a game print element 432, and volume control print elements 430 may be provided in the print medium. The music print element 436 may be selected to put the apparatus 500 in a "music mode" so that the selection of various print elements will cause the apparatus 500 to play music. The repeat question print element 434 may be selected by a user to repeat a question posed by the apparatus 500. The game print element 432 may be selected by the user to cause the apparatus to play a game. The volume control print elements 430 may be selected by the user to increase or decrease the volume of the apparatus 500.

Other print elements include a record print element 420 in the form of a red button. When a user selects this, the user can record his voice. If the user needs to re-record his voice, then the record print element 420 can be selected again.

Figure 7:
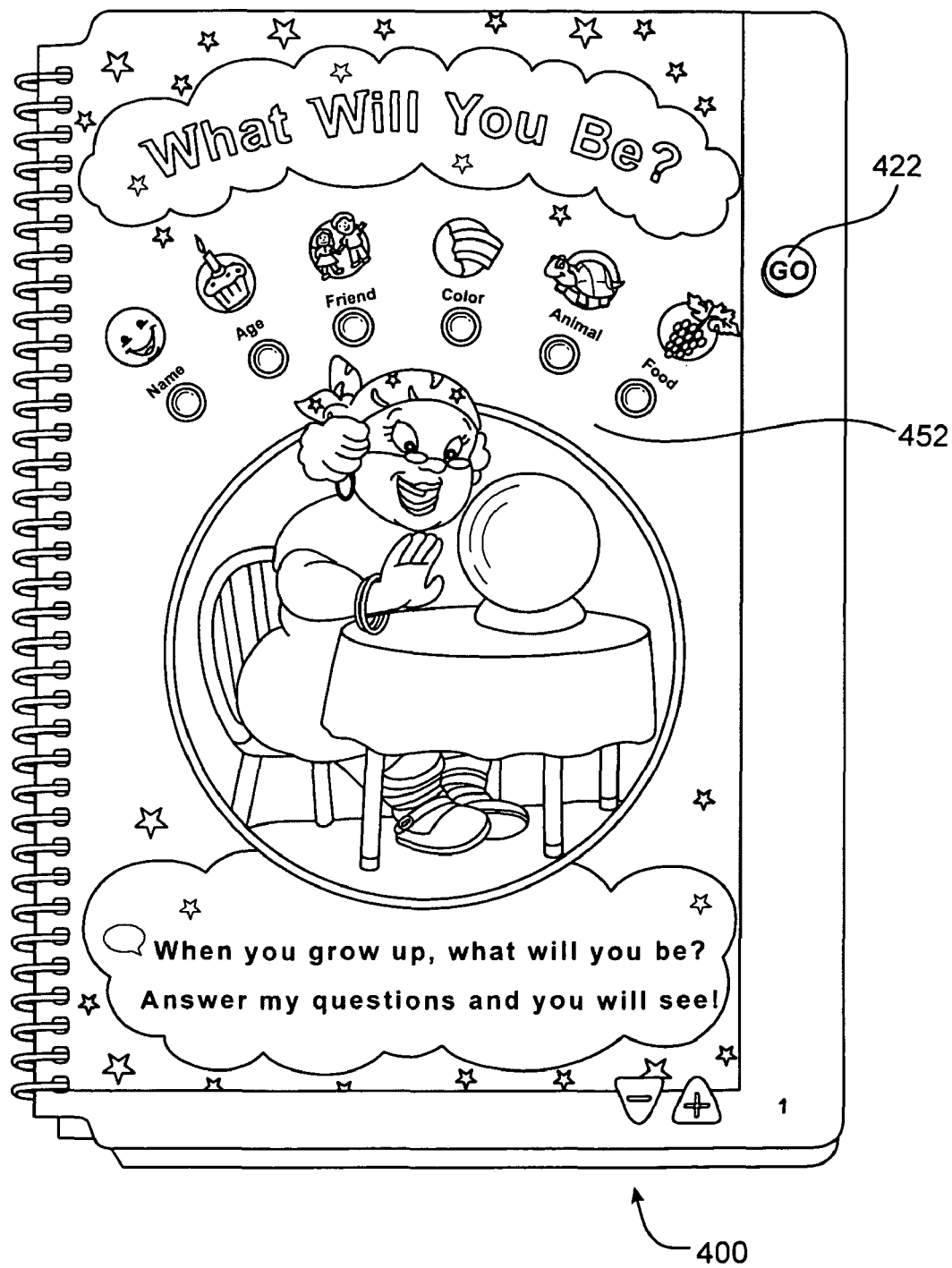
FIG. 7 shows a page in a book including record print elements.

FIG. 7 shows a page (i.e., a main record page) in the print medium 400 wherein a user can record the user's voice in response to various questions posed by the apparatus. For example, the illustrated fortuneteller may be called "Franny". Franny may ask the user to touch all of the red circles on the page to see what the future holds. After selecting the red dot print element 452 under the "Name" print element on the illustrated page, the apparatus may prompt the user and say, "What is your name?" A "beep" sound may sound from the speaker to prompt the user to state the user's name. If the user does not speak loudly enough, the apparatus may say, "I'm a bit hard of hearing, can you please say it again?" Another "beep" may sound and the user may try and record the user's voice again. Then, as a confirmation, the apparatus may say, "Well hello (name), I'm Franny, nice to meet you." Once recorded, the user's name can remain in an SRAM chip (or other memory component) in a memory device in the data cartridge (or in the platform). A similar type of recording process can be used to record the user's age, friend, color, animal, and food.

After recording the user's name, age, friend, color, animal, and food, this recorded information can be used in a story. As used herein, the term "story" includes poems, rhymes, and narratives about fictitious or real characters, people, places, things, etc. Alternatively, the recorded information could be used in a game. In a game, the apparatus may ask a question. After selecting a print element as an answer to the question, the user's previously recorded voice for that print element can be played. The recorded information may be interspersed with pre-recorded audio segments for other print elements such words, pictures, etc. in the book. The other print elements that are not associated with the record print elements could also be selectable so that audio related to these other print elements could also by played.

Figure 8A:
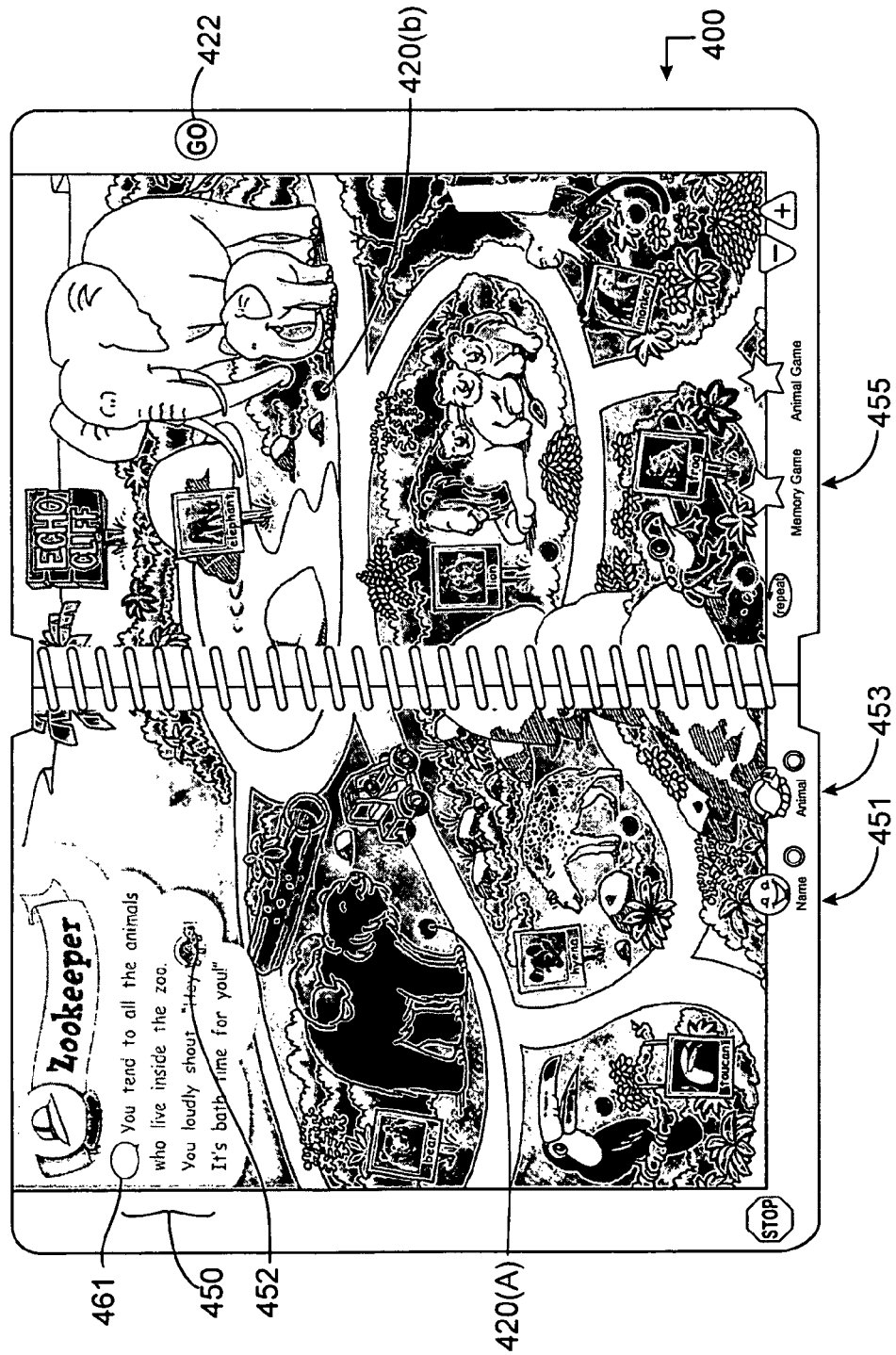
FIGS. 8(a)-8(c) shows pages in a book including record print elements, playback print elements, and other print elements.

Illustratively, as shown in FIG. 8(a), a narrative print element 461 can be selected by a user to read a story passage in the narrative 450. When the narrative passage 450 is read to the user, the user's recorded voice for the user's favorite animal (e.g., a bear) will sound between the sounds of the pre-recorded words "Hey" and "It's" as shown by the print element 452 in the form of a turtle (which represents the user's favorite animal). The resulting narrative is unique to the user and makes the interaction with the print medium 100 fun and interactive. The user may alternatively select the print element 452 in the form of a turtle directly to hear the user's recorded voice reciting the user's favorite animal. Other words such as "Hey" and "It's" are also selectable. For example, if the user selects the word "Hey", the word "hey" will sound from a speaker.

Favorite name and favorite animal print elements are also shown at the bottom of the left page. The user may select the shown dots to start the above-described recording process in case the user has changed the user's mind about the user's favorite animal. The same recording process as described above can be used.

In FIG. 8(a), other print elements are present. FIG. 8(a) shows a print element in the form of a bear with a first record print element 420(a) associated with it. FIG. 8 also shows a print element in the form of an elephant with a second record print element 420(b). In some embodiments, the user may select the print elements 420(a), 420(b) and the apparatus may prompt the user to make a bear or elephant sound. The same recording process as described above can be used.

Also in FIG. 8(a), at the bottom of the shown pages, there are additional record print elements 451, 453 associated with recording the user's name and associated with recording the name of the user's favorite animal. Although these were presented before on the main record page shown in FIG. 7, these additional record print elements can be provided in case the user wants to change the recorded information associated with the current pages that are being viewed.

A game print element 455 is also shown in FIG. 8(a). The game print element 455 allows a user to play a game with the user's recorded audio. For example, after selecting the game print element 455, a synthesized voice may ask "Can you find the lion, and then the bear?" After selecting the image of the lion, the user's previously recorded lion roar can sound. After selecting the image of the bear, the user's previously recorded bear growl can sound, and the synthesized voice may then provide a reward output such as "Good job!"

Figure 8B:
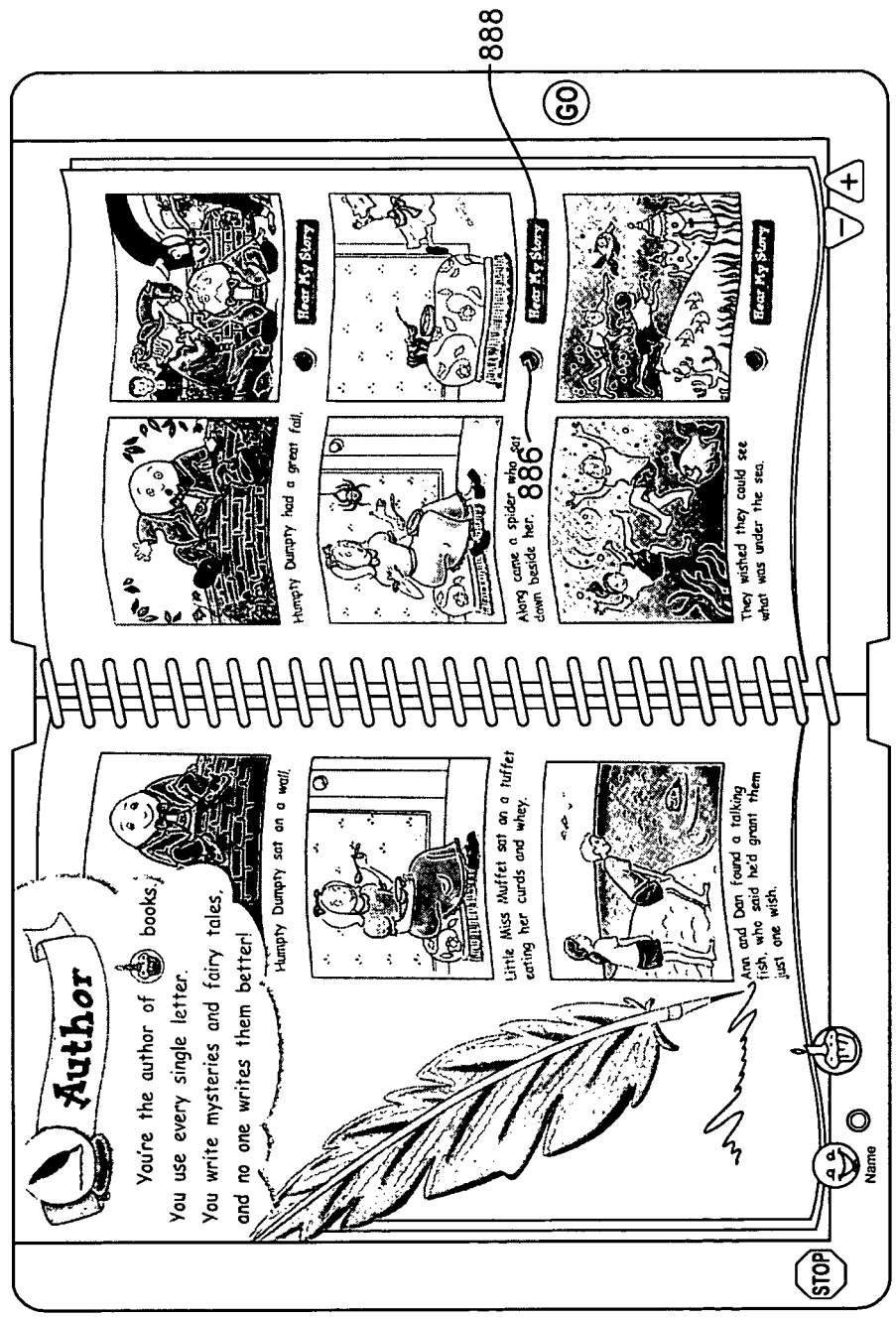

FIG. 8(b) shows two additional pages of a book that can be used with the electrographic position location apparatus. This set of pages illustrates a play pattern whereby the user can create his or her own stories with unique endings. As shown, a child can select the "Little Miss Muffet" story and a synthesized voice can read the words of the story. When the words reach the last panel of the 3-panel story, the synthesized voice may prompt the user to record the ending of the story by selecting the record button 886. The user then records a unique ending to the story (as described above) and can then select the "hear my story" print element 888 to hear the user's recorded ending to the story.

The embodiment shown in FIG. 8(b) is advantageous. Allowing a user to complete a story using his or her recorded voice allows the user to be creative and to learn how to describe things that the user sees. In addition, hearing the user's own voice reinforces the story-creating experience in the user.

Figure 8C:
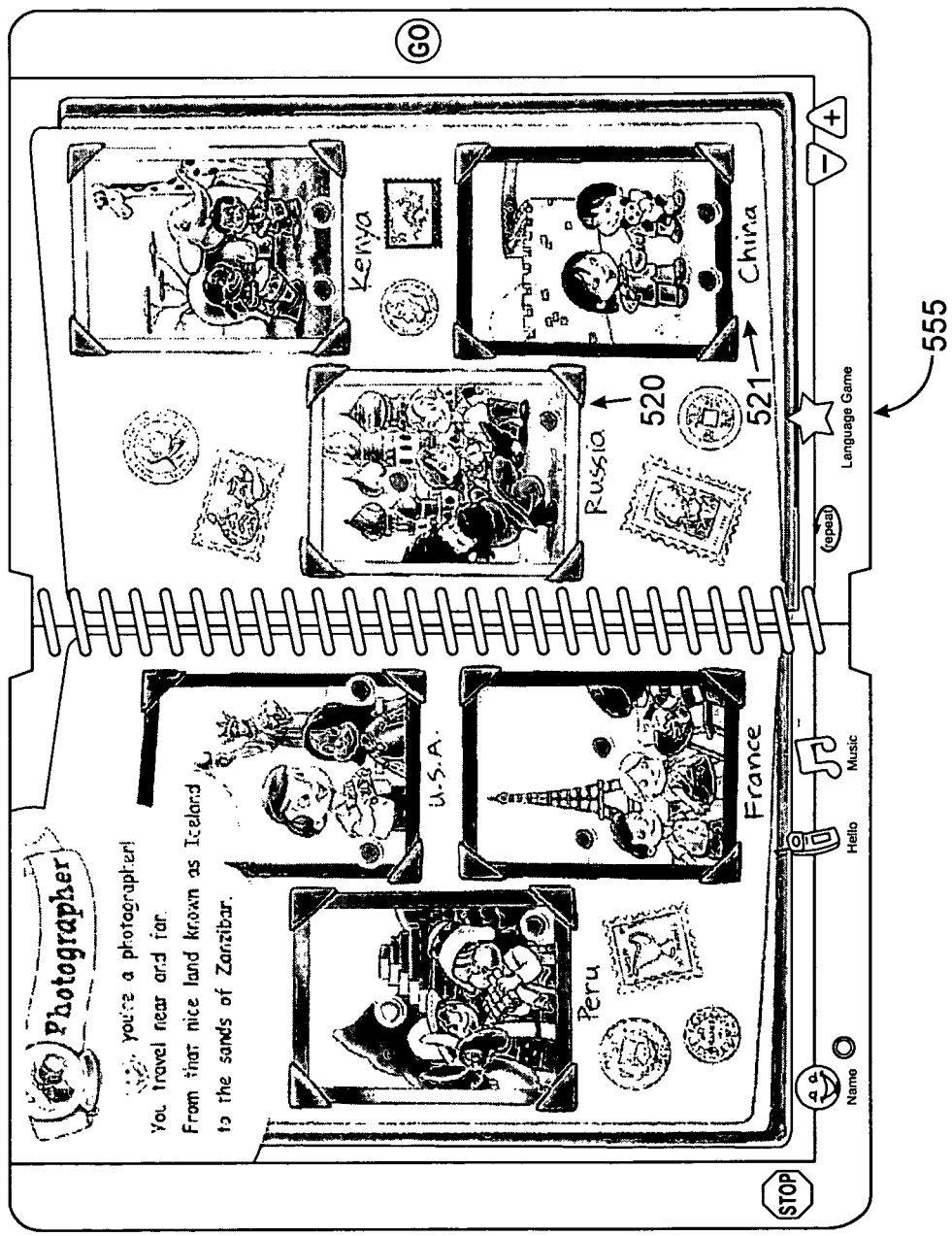

FIG. 8(c) shows another pair of pages that can be in a book that can be used with the electrographic position location apparatus. This pair of pages contains different images associated with different countries. As shown, there are a number of record print elements 520, 521 in the form of dots. Selecting a dot will allow a user to record his or her voice for the particular image associated with the selected dot. For instance, after selecting the dot 521 a synthesized voice may say "'Ni hao from China, my name is Mei Lin.' To say hello to Mei Lin, say 'Ni hao'." Then, the user can say the phrase "Ni hao" into the microphone of the electrographic position location apparatus. After selecting the image of the girl associated with the dot 521, the user's recorded voice saying "Ni hao ma?" can be played for the user.

After selecting a game print element 555, the user can play a language game. For example, a synthesized voice may say, "We need photos. Select as many photos as you can. Here, they say 'Ni hao'". The user can then select the picture above word "China" and can hear the user's previously recorded voice saying "Ni hao." Then voice can then say, "Here, they say 'Bon jour'". The user can then select the picture above the word "France", and the user can hear the user's previously recorded voice saying "Bon jour."

The embodiment shown in FIG. 8(*c*) has a number of advantages, since different languages are being taught. By recording the user's voice, the user can practice speaking a foreign language and can hear the user's voice. After hearing the user's voice, the user can compare it to the correct pronunciations for the spoken words by listening to both sounds. The pronunciations of the words (and also the meanings of the words) are reinforced in a way that cannot be done using, for example, a tape recorder and a book. In addition, selecting images associated with the spoken words also involves some kinesthetic action on the part of the user and this also helps the user retain information and learn. All of this can be done without the need for a human tutor. Thus, embodiments of the invention are particularly desirable for teaching a person about foreign languages.

Many other print elements and play patterns are described in the U.S. Provisional Patent Applications cited above.

Although electrographic position location apparatuses with detachable memory cartridges are described in detail herein, it is understood that embodiments of the invention are not limited thereto. For example, the particular play patterns that are described with reference to FIGS. 7 and 8(*a*)-8(*c*) could be used in an electrographic position location apparatus without a detachable data cartridge including a microphone. For example, the books and play patterns described with reference to FIGS. 7 and 8(*a*)-8(*c*) could be used with a platform that supports a book or other print medium. The platform can include a microphone and optionally a dummy microphone (as described below). For example, in some embodiments, a platform may include a well for receiving a dummy microphone that "pops up" from the well and allows a child to pretend that he or she is speaking into the microphone. In this example, the real microphone may be present in the platform itself. In yet other embodiments, the electrographic position location apparatus may be in the form of a gaming apparatus (described above) where the microphone structure pops up from a housing of a hand-held gaming apparatus.

Embodiments of the invention provide for a number of advantages. First, compared to conventional electrographic position location apparatuses, the electrographic position location apparatuses according to embodiments of the invention are more fun and interactive. As noted above, a user's recorded information can be interspersed with audio in a fun and interactive manner. Second, the data cartridge embodiments can be used with a platform in an electrographic position location apparatus that may not have been designed for recording capability. Accordingly, the embodiments including the data cartridge can advantageously provide the user with the option to record or not record the user's voice. Third, as shown in FIG. 6, the platforms in embodiments of the invention are free of record or playback buttons so that the platforms that are used in embodiments of the invention can be made smaller and less expensively than platforms with record and playback buttons.

Some embodiments of the invention are directed to kits including the above described data cartridges and the above described print media. Any of the above described data cartridges embodiments can be present with any number of type of the above-described print media without departing from the scope of the invention. The kits may also include a container, which contains the data cartridges and print media. The container may be a plastic container that contains the data cartridge and the print media together in package. The plastic container may be a molded relief package.

Figure 9:
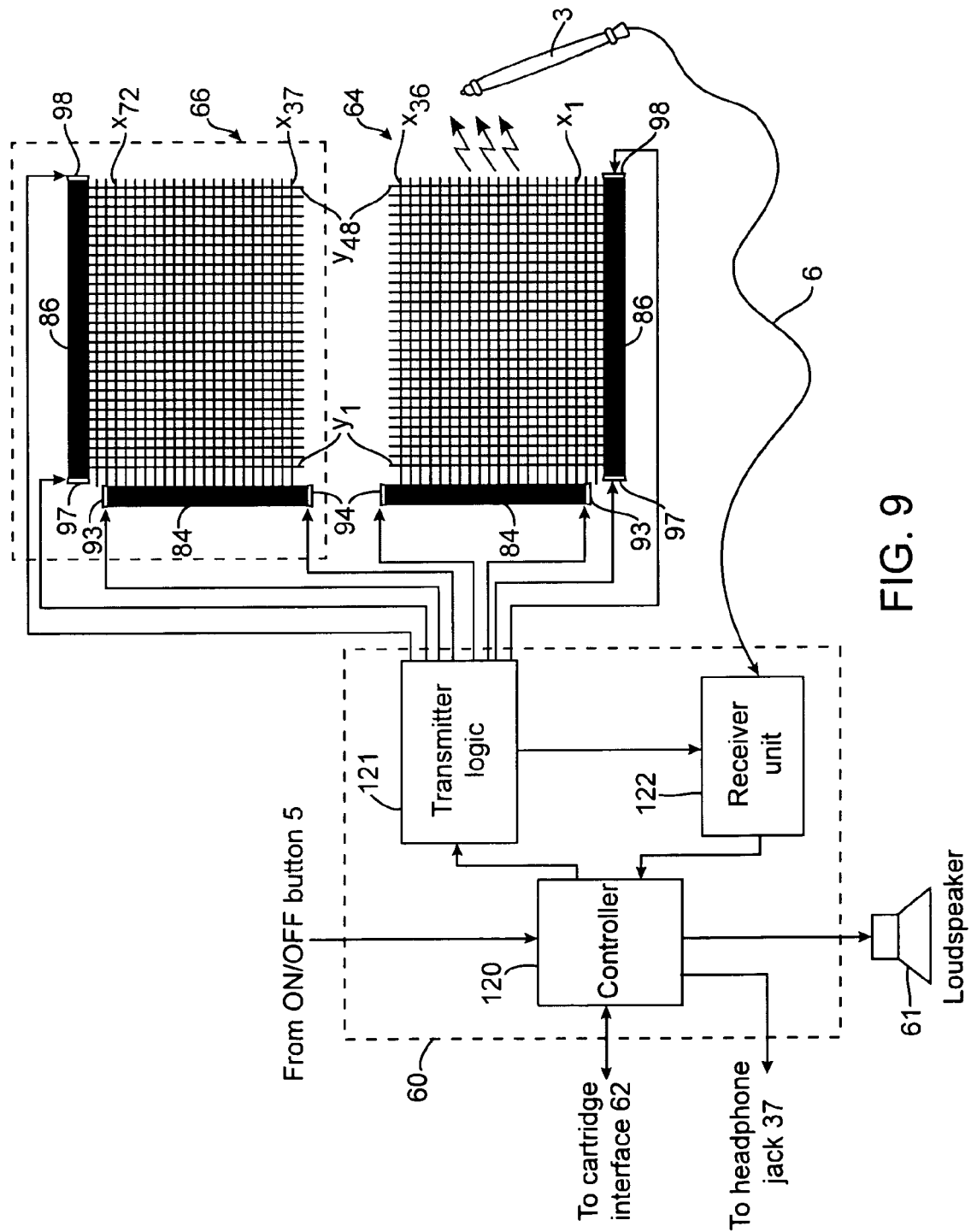
FIG. 9 shows a block diagram of some electrical components in an electrographic position location apparatus.

A block diagram of some components of an electrographic position location apparatus is shown in FIG. 9. FIG. 9 is a schematic block diagram of the processor 60 and antenna elements 64, 66. Each first antenna element can include a number of conductive fingers, which may also be considered individual antennas in some embodiments. The processor 60 comprises a controller unit 120, transmitter logic 121 and a receiver unit 122. The processor 60 may include a signal driver and a signal processor. The controller unit 120 is connected via the transmitter logic 121 to the first antenna elements 64, 66. The controller unit 120 is also connected via the receiver unit 122 via a wire 6 to a detection stylus 3. The transmitter logic 121 and receiver unit 122 are also connected to each other directly. The controller unit 120 is also connected to a headphone jack 37, a loudspeaker 61, a cartridge mating interface 62 (for the above described data cartridge) and an ON/OFF button 5.

The ON/OFF button 5 can be pressed, and the controller unit 120, which causes the transmitter logic 121 to be activated, detects this event. The transmitter logic 121 then applies electric signals to the electrical contacts 93, 94, 97, 98 of the first antenna elements 64, 66 in a sequence of frames. In these frames, each lasting approximately 3 milliseconds, predetermined electrical signals are applied to the contacts 93, 94, 97, 98 of the transmitting antenna arrangements 62, 64. At the end of each frame, a different set of signals is then applied to the contacts 93, 94, 97, 98.

In the course of a frame, an electromagnetic field is generated in the vicinity of the rectangular recesses in the upper sections in the housing portions of a platform. These electromagnetic fields induce voltage potentials in a brass ferrule in the detection stylus 3. This signal is then passed via the wire 6 to the receiver unit 122. In one example, the voltages applied to the contacts 93, 94, 97, 98 may range between plus three volts and minus three volts. The voltage induced within the brass ferrule can be about 0.5 millivolts. The receiver unit 122 then processes the induced voltage and a processed signal is then passed to the controller unit 120.

The controller unit 120 then converts the processed signals received from the receiver unit 122 into signals identifying the coordinates of the portion of the page of the book at which the detection stylus 3 is currently located. These coordinates are then used to select an appropriate sound stored within a sound memory either provided as part of the controller unit 120 or alternatively a sound memory provided as a memory chip within a cartridge inserted within the cartridge interface 62. The cartridge may be any of the above-described cartridges. The appropriate sound is then output via the loudspeaker 61 or to a set of headphones via the headphone jack 37.

The processor in the platform of the electrographic position location apparatus may be embodied by or present in an application specific integrated circuit or ASIC. The ASIC used in the apparatus may not have the ability to record audio. The ASIC may not have the ability to import an audio signal from an external recorder chip and mix it with the ASIC based audio streams.

An external mixer could be used to mix the audio outputs from the recorder chip and the ASIC into a single audio stream that could be sent to a speaker. However, there are some problems with this approach. First, the ASIC may use a direct digital drive audio output and the recorder chip may output an analog audio signal. Second, the resulting audio quality could go down, because an additional mix chip would be needed. Third, the apparatus cost would increase, because of the use of an additional mix chip. Fourth, software would have to be changed to control the audio output volume of the recorder chip output and the resulting mixed audio output.

To address these problems, one could use the ASIC's ability to play back an audio stream read from its program/data storage area. Such data is conventionally stored in a memory device such as a ROM or flash chip. However, it is possible to interface the recorder chip to the ASIC and have the ASIC pretend that the recorder chip is a memory device. The recorder chip presents its recorded data to the ASIC in response to the ASIC reading from what it believes is a memory device. The data is formatted by the recorder chip into a form expected by the ASIC. The ASIC can then internally mix this recorded audio with its other audio streams, thus sending out a single direct digital drive audio signal. The removes the need for an external audio mixer. The quality of the audio playback remains high, because sound signals are not fed through an additional audio component.

To provide better sound quality, recording thresholds can be used. A record memory is typically divided into many buffers, each of which may be very short (e.g., 0.75 to 2.0 seconds). Normally, when the microphone is turned on to record into a buffer, it takes the user some amount of time to react to a prompt to start speaking. This delay is then recorded as silence into the buffer, essentially wasting buffer space. This extra silence also makes the playback of the buffer between other pieces of audio sound "choppy", because of this extra silence at the beginning. To address this problem, a recording threshold is used. When recording starts, the recording electronics wait for noise of certain level. When a certain threshold value is reached, the recording electronics start recording sounds into a buffer. Until that threshold is reached, the recording electronics are waiting for the user to record. This advantageously removes any silence from the beginning of a recording.

If the user does not speak, the recording threshold may never be reached. A timeout feature can be used to address this problem. If the recording electronics have not detected noise exceeding the threshold by a certain amount of time, the recording is terminated and a special audio prompt can be given to the user.

If the user stops speaking before the end of a buffer, there can be silence from that point to the end of the buffer. This trailing silence also can cause the playback of the buffer to sound choppy when other audio is played after such a buffer. To address this problem, a trailing silence threshold can be used. After the buffer is finished recording, the recording electronics review the recorded sound from the end of the buffer moving backwards. Sounds below the threshold are discarded and the end of the buffer is adjusted to be at the point of the last recorded sound above the threshold.

In addition to the leading and trailing silence thresholds, during playback of a recorded buffer, it is possible to attenuate (fade in/out) the beginning and ending of recorded audio. This avoids large discontinuities (heard as "pops" in the audio playback) in sampled information. By applying a ramp up envelope to the beginning of the recording and a ramp down envelope to the ending, these distorted sounds can be eliminated.

Recording thresholds and other functions such as attenuating sounds can be programmed into the apparatus by those of ordinary skill in the art.

Figure 10:
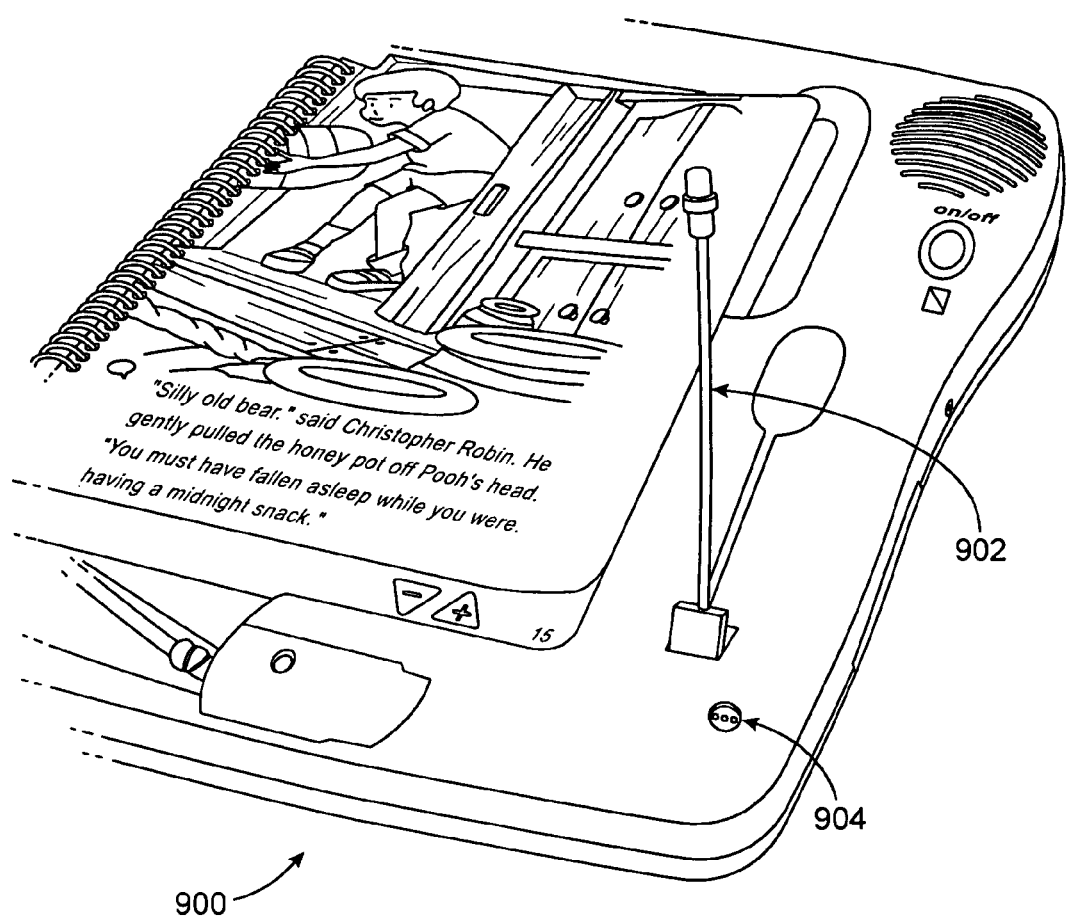
FIG. 10 shows a perspective view of an electrographic position location apparatus without a data cartridge, wherein a dummy microphone is coupled to a platform of an electrographic position location apparatus.

FIG. 10 shows a perspective view of an electrographic position location apparatus without a data cartridge. A microphone structure 902 with a head portion and a neck is shown. In preferred embodiments, the microphone structure 902 is a dummy microphone structure with any of the features described above. An opening 904 for a microphone may be present near the base of the microphone structure 902. As shown, there is a recess that in the platform 900 that is cooperatively structured to receive the microphone structure 902, and the microphone structure 902 can "pop up" in some embodiments. Although the microphone structure 902 is directly coupled to the platform 900, the advantages described above with respect to the dummy microphone are still applicable for this embodiment. For example, in comparison to the above-described Record 'n Learn Pad, the user's mouth will be spaced at a consistent distance from the actual recording microphone, whether it is in the head portion of the microphone structure 902 or is under the opening 904 in the platform 900, thereby providing higher quality recordings. Any of the above-described features for the data cartridges and/or the above-described electrographic position location apparatuses can be combined any suitable manner with the features shown in FIG. 10. For example, although the recording electronics that are shown in FIGS. 4-5A-5J are described with reference to a data cartridge, they can be used with in an electrographic position location apparatus that does not need to use a data cartridge.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention. For example, the data cartridge shown in FIG. 3 can be used in any of the electrographic position location apparatuses described in the application without departing from the spirit and the scope of the invention.

All references, patent applications, and patents mentioned above are herein incorporated by reference in their entirety for all purposes. None of them are admitted to be prior art to the presently claimed inventions.

What is claimed is:

1. An electrographic position location apparatus comprising:
   (a) a platform comprising a surface;
   (b) a print medium including a print element, wherein the print medium is capable of being received on the platform;
   (c) a plurality of electrical elements in the platform and under the surface;

(d) a microprocessor coupled to the plurality of electrical elements;
(e) a memory device coupled to the microprocessor, wherein the memory device comprises code for recording a user's voice, code for storing the user's recorded voice, and code for playing back the user's voice;
(f) an audio output device coupled to the microprocessor;
(g) a microphone in the platform; and
(h) a dummy microphone structure fixedly coupled to the platform, wherein the dummy microphone structure comprises a head portion and a neck, and the dummy microphone structure spaces a user's mouth an appropriate distance from the microphone in the platform.

2. The electrographic position location apparatus of claim 1 wherein the platform further comprises a recess for receiving the dummy microphone structure.

3. The electrographic position location apparatus of claim 1 wherein the print medium comprises a record print element and a playback print element.

4. The electrographic position location apparatus of claim 1 wherein the platform is foldable.

5. The electrographic position location apparatus of claim 1 wherein the print medium comprises print elements for a game or for a story.

6. The electrographic position location apparatus of claim 1 wherein the dummy microphone structure comprises an LED.

7. A toy comprising:
(a) a housing having an electronic display screen;
(b) a plurality of electrical elements in the housing and under the electronic display screen;
(c) a microprocessor coupled to the plurality of electrical elements;
(d) a memory device coupled to the microprocessor, wherein the memory device comprises code for recording a user's voice, code for storing the user's recorded voice, code for playing back the user's voice, and code for generating one or more images on the electronic display screen;
(e) an audio output device coupled to the microprocessor; and
(f) a dummy microphone structure fixedly coupled to the housing, wherein the dummy microphone structure comprises a head portion and a neck, and wherein the toy further comprises a microphone in the platform and the dummy microphone structure spaces a user's mouth an appropriate distance from the microphone in the platform.

8. The electrographic position location apparatus of claim 2 wherein the dummy microphone structure is configured to pop up from the recess.

9. The electrographic position location apparatus of claim 6 further comprising a wire connecting the LED to the microprocessor, wherein the wire has a diameter of about 1 mm or more.

10. The toy of claim 7 wherein the electronic display screen comprises a liquid crystal display.

11. The toy of claim 7 wherein the memory device further comprises code for generating animation on the electronic display screen.

* * * * *